US012014683B2

(12) United States Patent
Hu et al.

(10) Patent No.: US 12,014,683 B2
(45) Date of Patent: Jun. 18, 2024

(54) PIXEL CIRCUIT, PIXEL DRIVING METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ming Hu, Beijing (CN); Benlian Wang, Beijing (CN); Yao Huang, Beijing (CN); Weiyun Huang, Beijing (CN)

(73) Assignee: CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 131 days.

(21) Appl. No.: 17/779,034

(22) PCT Filed: Apr. 26, 2021

(86) PCT No.: PCT/CN2021/089988

§ 371 (c)(1),
(2) Date: May 23, 2022

(87) PCT Pub. No.: WO2022/226733

PCT Pub. Date: Nov. 3, 2022

(65) Prior Publication Data

US 2023/0026507 A1 Jan. 26, 2023

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01)

(58) Field of Classification Search
None
See application file for complete search history.

(56) References Cited

U.S. PATENT DOCUMENTS

2006/0055336 A1 3/2006 Jeong
2015/0235595 A1 8/2015 Sugihara et al.
(Continued)

FOREIGN PATENT DOCUMENTS

CN 1744774 A 3/2006
CN 104715712 A 6/2015
(Continued)

OTHER PUBLICATIONS

Luo, H., Wang, S., Kang, J., Wang, Y.-M., et al. "Complementary LTPO Technology, Pixel Circuits and Integrated Gate Drivers for AMOLED Displays Supporting Variable Refresh Rates". SID Symposium Digest of Technical Papers, 2020, 24-3, pp. 351-354. vol. 51 https://doi.org/10.1002/sdtp.13876.

*Primary Examiner* — Carl Adams
(74) *Attorney, Agent, or Firm* — Muncy, Geissler, Olds & Lowe, P.C.

(57) ABSTRACT

The present disclosure provides a pixel circuit, a pixel driving method and a display device. The pixel circuit includes a first initialization circuit and a compensation circuit; the first initialization circuit controls to provide a first initial voltage to the driving control node under the control of the first initial control signal; the compensation circuit controls the compensation node to be connected to the first node under the control of the compensation control signal; at least one of the first initialization circuit and the compensation circuit includes an oxide thin film transistor and a low temperature polysilicon thin film transistor connected in series.

13 Claims, 11 Drawing Sheets

(56) References Cited

U.S. PATENT DOCUMENTS

| | | | |
|---|---|---|---|
| 2016/0321995 A1 | 11/2016 | Shin | |
| 2018/0006099 A1 | 1/2018 | Ka et al. | |
| 2018/0158407 A1* | 6/2018 | Chai | G09G 3/3258 |
| 2021/0049959 A1 | 2/2021 | Park et al. | |
| 2021/0118361 A1 | 4/2021 | Li | |
| 2021/0134224 A1 | 5/2021 | He et al. | |

FOREIGN PATENT DOCUMENTS

| | | | |
|---|---|---|---|
| CN | 205722744 | U | 11/2016 |
| CN | 106782340 | A | 5/2017 |
| CN | 107564468 | A | 1/2018 |
| CN | 109087610 | A | 12/2018 |
| CN | 110648629 | A | 1/2020 |
| CN | 111724745 | A | 9/2020 |
| CN | 111754920 | A | 10/2020 |
| CN | 112233621 | A | 1/2021 |
| CN | 112397025 | A | 2/2021 |
| CN | 112397028 | A | 2/2021 |
| CN | 112397030 | A | 2/2021 |
| WO | WO-2013179847 | A1 | 12/2013 |

* cited by examiner

PIXEL CIRCUIT, PIXEL DRIVING METHOD AND DISPLAY DEVICE

CROSS-REFERENCE TO RELATED APPLICATION

This application is the U.S. national phase of PCT Application No. PCT/CN2021/089988 filed on Apr. 26, 2021, which are incorporated herein by reference in their entities.

TECHNICAL FIELD

The present disclosure relates to the field of display technology, and more particularly to a pixel circuit, a pixel driving method and a display device.

BACKGROUND

Existing low temperature polysilicon (LTPS) display panels utilize the high mobility characteristics of LTPS and are used in display fields that require high switching speeds; however, LTPS thin film transistors (TFTs) have current leakage problems due to their transistor characteristics, and display effect in the low frequency display field is not good.

SUMMARY

A first aspect of the present disclosure provides a pixel circuit, including: a first initialization circuit and a compensation circuit; the first initialization circuit is electrically connected to a driving control node, a first initial control terminal and a first initial voltage terminal, and is configured to control the first initial voltage terminal to provide a first initial voltage to the driving control node under the control of a first initial control signal provided by the first initial control terminal; the compensation circuit is electrically connected to a compensation control terminal, a compensation node and a first node, and is configured to control the compensation node to be connected to the first node under the control of a compensation control signal provided by the compensation control terminal; at least one of the first initialization circuit and the compensation circuit includes an oxide thin film transistor and a low temperature polysilicon thin film transistor connected in series.

Optionally, the compensation node and the driving control node are a same node.

Optionally, the driving control node and the compensation node are different nodes; the first initialization circuit is further electrically connected to a first voltage terminal; the first initialization circuit includes a control sub-circuit and an initialization sub-circuit; the control sub-circuit is respectively electrically connected to the first voltage terminal, the driving control node and the compensation node, and is configured to control the driving control node to be connected to the compensation node under the control of the first voltage signal provided by the first voltage terminal; the initialization sub-circuit is electrically connected to a first initial control terminal, a first initial voltage terminal and the compensation node, and is configured to write the first initial voltage into the compensation node under the control of the first initial control signal.

Optionally, the control sub-circuit includes a first transistor, and the initialization sub-circuit includes a second transistor; a control electrode of the first transistor is electrically connected to the first voltage terminal, a first electrode of the first transistor is electrically connected to the compensation node, and a second electrode of the first transistor is electrically connected to the driving control node; a control electrode of the second transistor is electrically connected to the first initial control terminal, a first electrode of the second transistor is electrically connected to the first initial voltage terminal, and a second electrode of the second transistor is electrically connected to the compensation node; the first transistor is the low temperature polysilicon thin film transistor, and the second transistor is the oxide thin film transistor; the first voltage terminal is a first low voltage terminal.

Optionally, the first initialization circuit is further electrically connected to a first voltage terminal; the first initialization circuit includes a control sub-circuit and an initialization sub-circuit, the control sub-circuit is electrically connected to the first voltage terminal, the first initial voltage terminal and a second node, and is configured to control to write the first initial voltage into the second node under the control of the first voltage signal provided by the first voltage terminal; the initialization sub-circuit is electrically connected to the first initial control terminal, the second node and the driving control node, and is configured to control the second node to be connected to the driving control node under the control of the first initial control signal.

Optionally, the control sub-circuit includes a first transistor, and the initialization sub-circuit includes a second transistor, a control electrode of the first transistor is electrically connected to the first voltage terminal, a first electrode of the first transistor is electrically connected to the first initial voltage terminal, and a second electrode of the first transistor is electrically connected to the second node; a control electrode of the second transistor is electrically connected to the first initial control terminal, a first electrode of the second transistor is electrically connected to the second node, and a second electrode of the second transistor is electrically connected to the driving control node; the first transistor is the low temperature polysilicon thin film transistor, and the second transistor is the oxide thin film transistor; the first voltage terminal is a first low voltage terminal.

Optionally, the first initialization circuit is further electrically connected to a first voltage terminal; the first initialization circuit includes a control sub-circuit and an initialization sub-circuit, the first initialization circuit is electrically connected to the first voltage terminal, the driving control node and the second node, and is configured to control the driving control node to be connected to the second node under the control of the first voltage signal provided by the first voltage terminal; the second initialization circuit is electrically connected to the first initial control terminal, the first initial voltage terminal and the second node, and is configured to control to write the first initial voltage into the second node under the control of the first initial control signal.

Optionally, the control sub-circuit includes a first transistor, and the initialization sub-circuit includes a second transistor; a control electrode of the first transistor is electrically connected to the first voltage terminal, a first electrode of the first transistor is electrically connected to the second node, and a second electrode of the first transistor is electrically connected to the driving control node; a control electrode of the second transistor is electrically connected to the first initial control terminal, a first electrode of the second transistor is electrically connected to the first initial voltage terminal, and a second electrode of the second transistor is electrically connected to the second node; the first transistor is the low temperature polysilicon thin film transistor, and the second transistor is the oxide thin film transistor; the first voltage terminal is a first low voltage terminal.

Optionally, the compensation circuit is further electrically connected to the first voltage terminal, and the compensation circuit includes a first compensation sub-circuit and a second compensation sub-circuit; the first compensation sub-circuit is electrically connected to the first voltage terminal, the compensation node and a third node, and is configured to control the compensation node to be connected to the third node under the control of the first voltage signal provided by the first voltage terminal; the second compensation sub-circuit is electrically connected to the compensation control terminal, the third node and the first node, and is configured to control the third node to be connected to the first node under the control of the compensation control signal.

Optionally, the first compensation sub-circuit includes a third transistor, and the second compensation sub-circuit includes a fourth transistor; a control electrode of the third transistor is electrically connected to the first voltage terminal, a first electrode of the third transistor is electrically connected to the compensation node, and a second electrode of the third transistor is electrically connected to the third node; a control electrode of the fourth transistor is electrically connected to the compensation control terminal, a first electrode of the fourth transistor is electrically connected to the third node, and a second electrode of the fourth transistor is electrically connected to the first node; the third transistor is the oxide thin film transistor, and the fourth transistor is the low temperature polysilicon thin film transistor.

Optionally, the compensation circuit is further electrically connected to the first voltage terminal, and the compensation circuit includes a first compensation sub-circuit and a second compensation sub-circuit; the first compensation sub-circuit is electrically connected to the first voltage terminal, the third node and the first node respectively, and is configured to control the third node to be connected to the first node under the control of the first voltage signal provided by the first voltage terminal; the second compensation sub-circuit is electrically connected to the compensation control terminal, the third node and the compensation node, and is configured to control the third node to be connected to the compensation node under the control of the compensation control signal.

Optionally, the first compensation sub-circuit includes a third transistor, and the second compensation sub-circuit includes a fourth transistor; a control electrode of the third transistor is electrically connected to the first voltage terminal, a first electrode of the third transistor is electrically connected to the third node, and a second electrode of the third transistor is electrically connected to the first node; a control electrode of the fourth transistor is electrically connected to the compensation control terminal, a first electrode of the fourth transistor is electrically connected to the compensation node, and a second electrode of the fourth transistor is electrically connected to the third node; the third transistor is the oxide thin film transistor, and the fourth transistor is the low temperature polysilicon thin film transistor.

Optionally, the pixel circuit further includes a light-emitting element, a driving circuit, a light-emitting control circuit, a data writing-in circuit, and an energy storage circuit, wherein, the data writing-in circuit is electrically connected to a data writing-in control terminal, a data line and a fourth node respectively, and is configured to control to write a data voltage provided by the data line into the fourth node under the control of a data writing-in control signal provided by the data writing-in control terminal; the light-emitting control circuit is respectively electrically connected to a light-emitting control line, a second voltage terminal, the fourth node, the first node and the light-emitting element, and is configured to control the fourth node to be connected to the second voltage terminal and control the first node to be connected to the light-emitting element under the control of a light-emitting control signal provided by the light-emitting control line; a first terminal of the energy storage circuit is electrically connected to the driving control node, a second terminal of the energy storage circuit is electrically connected to the second voltage terminal, and the energy storage circuit is used for storing electrical energy; the driving circuit is electrically connected to the driving control node, the fourth node and the first node, and is configured to generate a driving current flowing from the fourth node to the first node under the control of a potential of the driving control node.

Optionally, the pixel circuit further includes a second initialization circuit; the second initialization circuit is electrically connected to the data writing-in control terminal, a second initial voltage terminal and a first electrode of the light-emitting element, and is configured to control to write a second initial voltage provided by the second initial voltage terminal into the first electrode of the light-emitting element under the control of the data writing-in control signal; a second electrode of the light-emitting element is electrically connected to a third voltage terminal.

Optionally, the driving circuit includes a driving transistor, the light-emitting control circuit includes a fifth transistor and a sixth transistor, the data writing-in circuit includes a seventh transistor, and the energy storage circuit includes a storage capacitor, wherein, a control electrode of the driving transistor is electrically connected to the driving control node, a first electrode of the driving transistor is electrically connected to the fourth node, and a second electrode of the driving transistor is electrically connected to the first node; a control electrode of the fifth transistor is electrically connected to the light-emitting control line, a first electrode of the fifth transistor is electrically connected to the second voltage terminal, and a second electrode of the fifth transistor is electrically connected to the fourth node; a control electrode of the sixth transistor is electrically connected to the light-emitting control line, a first electrode of the sixth transistor is electrically connected to the first node, and a second electrode of the sixth transistor is electrically connected to the light-emitting element; a control electrode of the seventh transistor is electrically connected to the data writing-in control terminal, a first electrode of the seventh transistor is electrically connected to the data line, and a second electrode of the seventh transistor is electrically connected to the fourth node; a first terminal of the storage capacitor is electrically connected to the driving control node, and a second terminal of the storage capacitor is electrically connected to the second voltage terminal.

Optionally, the second initialization circuit includes an eighth transistor; a control electrode of the eighth transistor is electrically connected to the data writing-in control terminal, a first electrode of the eighth transistor is electrically connected to the second initial voltage terminal, and a second electrode of the eighth transistor is electrically connected to the first electrode of the light-emitting element; the eighth transistor is the low temperature polysilicon thin film transistor.

In a second aspect, an embodiment of the present disclosure provides a pixel driving method, applied to the pixel circuit, wherein a display period includes an initialization phase and a data writing-in phase that are set in sequence;

the pixel driving method includes: in the initialization phase, controlling, by the first initialization circuit, the first initial voltage terminal to provide the first initial voltage to the driving control node under the control of the first initial control signal provided by the first initial control terminal; in the data writing-in phase, controlling, by the compensation circuit, the compensation node to be connected to the first node under the control of the compensation control signal provided by the compensation control terminal.

Optionally, the driving control node and the compensation node are a same node; or, the driving control node and the compensation node are different nodes, and the first initialization circuit is further electrically connected to the first voltage terminal; the first initialization circuit includes a control sub-circuit and an initialization sub-circuit; the step of controlling, by the first initialization circuit, the first initial voltage terminal to provide the first initial voltage to the driving control node under the control of the first initial control signal provided by the first initial control terminal includes: controlling, by the control sub-circuit, the driving control node to be connected to the compensation node under the control of the first voltage signal provided by the first voltage terminal; and controlling, by the initialization sub-circuit, to write the first initial voltage into the compensation node under the control of the first initial control signal.

Optionally, the driving control node and the compensation node are a same node, the first initialization circuit is further electrically connected to a first voltage terminal; the first initialization circuit includes a control sub-circuit and an initialization sub-circuit, the step of controlling, by the first initialization circuit, the first initial voltage terminal to provide the first initial voltage to the driving control node under the control of the first initial control signal provided by the first initial control terminal includes: controlling, by the control sub-circuit, to write the first initial voltage into the second node under the control of the first voltage signal provided by the first voltage terminal; controlling, by the initialization sub-circuit, the second node to be connected to the driving control node under the control of the first initial control signal.

Optionally, the driving control node and the compensation node are a same node, the first initialization circuit is further electrically connected to a first voltage terminal; the first initialization circuit includes a control sub-circuit and an initialization sub-circuit, the step of controlling, by the first initialization circuit, the first initial voltage terminal to provide the first initial voltage to the driving control node under the control of the first initial control signal provided by the first initial control terminal includes: controlling, by the control sub-circuit, the driving control node to be connected to the second node under the control of the first voltage signal provided by the first voltage terminal; controlling, by the initialization sub-circuit, to write the first initial voltage into the second node under the control of the first initial control signal.

Optionally, the compensation circuit is also electrically connected to the first voltage terminal, and the compensation circuit includes a first compensation sub-circuit and a second compensation sub-circuit; the step of controlling, by the compensation circuit, the compensation node to be connected to the first node under the control of a compensation control signal provided by the compensation control terminal includes: controlling, by the first compensation sub-circuit, the compensation node to be connected to the third node under the control of the first voltage signal provided by the first voltage terminal; controlling, by the second compensation sub-circuit, the third node to be connected to the first node under the control of the compensation control signal.

Optionally, the compensation circuit is further electrically connected to the first voltage terminal, and the compensation circuit includes a first compensation sub-circuit and a second compensation sub-circuit; the step of controlling, by the compensation circuit, the compensation node to be connected to the first node under the control of a compensation control signal provided by the compensation control terminal includes: controlling, by the first compensation sub-circuit, the third node to be connected to the first node under the control of the first voltage signal provided by the first voltage terminal; controlling, by the second compensation sub-circuit, the third node to be connected to the compensation node under the control of the compensation control signal.

In a third aspect, an embodiment of the present disclosure provides a display device including the pixel circuit.

DETAILED DESCRIPTION

Figure 1:
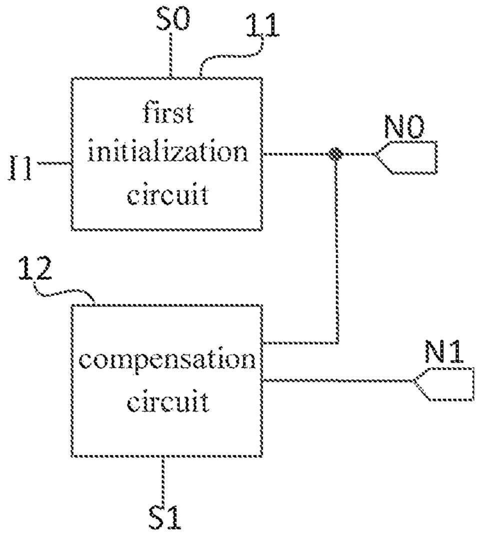
FIG. 1 is a structural diagram of a pixel circuit according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor other than the control electrode, one electrode is called the first electrode, and the other electrode is called the second electrode.

In actual operation, when the transistor is a triode, the control electrode may be the base electrode, the first electrode may be the collector, and the second electrode may be the emitter; or the control electrode may be the base electrode, the first electrode can be an emitter, and the second electrode can be a collector.

In actual operation, when the transistor is a thin film transistor or a field effect transistor, the control electrode may be a gate electrode, the first electrode may be a drain electrode, and the second electrode may be a source electrode. The control electrode may be a gate electrode, the first electrode may be a source electrode, and the second electrode may be a drain electrode.

The pixel circuit described in the embodiment of the present disclosure includes a first initialization circuit and a compensation circuit;

The first initialization circuit is respectively electrically connected to a driving control node, a first initial control terminal and a first initial voltage terminal, and is configured to control the first initial voltage terminal to provide a first initial voltage signal to the driving control node under the control of the a first initial control signal provided by the first initial control terminal;

The compensation circuit is electrically connected to a compensation control terminal, a compensation node and a first node respectively, and is configured to control the compensation node to be connected to the first node under the control of a compensation control signal provided by the compensation control terminal;

At least one of the first initialization circuit and the compensation circuit includes an oxide thin film transistor and a low temperature polysilicon thin film transistor connected in series.

In the embodiment of the present disclosure, an oxide thin film transistor is included on a current leakage path of the driving control node. By utilizing the low current leakage characteristics of the oxide thin film transistor, the embodiment of the present disclosure can well maintain the potential of the driving control node, so as to alleviate the phenomenon that the potential of the driving control node cannot be well maintained due to the current leakage of electricity, thereby affecting the display.

In at least one embodiment of the present disclosure, the current leakage path of the driving control node may include: a first current leakage path from the driving control node to a first initial voltage terminal, and a second current leakage path from the driving control node to a second initial voltage terminal.

In the pixel circuit according to the embodiment of the present disclosure, at least one of the first initialization circuit and the compensation circuit includes an oxide thin film transistor and a low temperature polysilicon thin film transistor connected in series, so that the circuit for initializing the potential of the driving control node and/or the circuit for compensation includes not only oxide thin film transistors but also low temperature polysilicon thin film transistors.

In at least one embodiment of the present disclosure, when the low temperature polysilicon thin film transistor is a normally-on transistor and the low temperature polysilicon thin film transistor is directly electrically connected to the driving control node, the potential of the driving control node can be stabilized.

In at least one embodiment of the present disclosure, when one of the first initialization circuit and the compensation circuit includes an oxide thin film transistor and a low temperature polysilicon thin film transistor connected in series, the other of the first initialization circuit and the compensation circuit may include an oxide thin film transistor to further improve the current leakage phenomenon, but not limited thereto.

When the pixel circuit described in the embodiment of the present disclosure is in operation, the display period may include an initialization phase and a data writing-in phase that are set in sequence;

In the initialization phase, the first initialization circuit controls the first initial voltage terminal to provide the first initial voltage to the driving control node under the control of the first initial control signal provided by the first initial control terminal;

In the data writing-in phase, under the control of the compensation control signal provided by the compensation control terminal, the compensation circuit controls the compensation node to be connected to the first node to compensate the threshold voltage of the driving transistor in the pixel circuit.

Optionally, the driving control node and the compensation node may be a same node.

Optionally, the driving control node and the compensation node may be different nodes; the first initialization circuit is further electrically connected to the first voltage terminal; the first initialization circuit includes a control sub-circuit and an initialization sub-circuit.

The first initialization circuit is respectively electrically connected to the first voltage terminal, the driving control node and the compensation node, and is configured to control the driving control node to be connected to the compensation node under the control of the first voltage signal provided by the first voltage terminal.

The second initialization circuit is respectively electrically connected to the first initial control terminal, the first initial voltage terminal and the second node, and is configured to control to write the first initial voltage into the compensation node under the control of the first initial control signal.

In at least one embodiment of the present disclosure, the control sub-circuit includes a first transistor, and the initialization sub-circuit includes a second transistor;

A control electrode of the first transistor is electrically connected to the first voltage terminal, a first electrode of the first transistor is electrically connected to the compensation node, and a second electrode of the first transistor is electrically connected to the driving control node;

A control electrode of the second transistor is electrically connected to the first initial control terminal, a first electrode of the second transistor is electrically connected to the first initial voltage terminal, and a second electrode of the second transistor is electrically connected to the compensation node;

The first transistor is a low temperature polysilicon thin film transistor, and the second transistor is an oxide thin film transistor;

The first voltage terminal is a first low voltage terminal.

As shown in FIG. 1, the pixel circuit described in the embodiment of the present disclosure includes a first initialization circuit 11 and a compensation circuit 12;

The first initialization circuit 11 is respectively electrically connected to the driving control node N0, the first initial control terminal S0 and the first initial voltage terminal I1, and is configured to control the first initial voltage terminal I1 to provide a first initial voltage signal to the driving control node N0 under the control of the a first initial control signal provided by the first initial control terminal S0;

The compensation circuit 12 is electrically connected to the compensation control terminal S1, the driving control node N0 and the first node N1 respectively, and is configured to control the compensation node N0 to be connected to the first node N1 under the control of a compensation control signal provided by the compensation control terminal S1.

In at least one embodiment of the pixel circuit shown in FIG. 1, the first initialization circuit 11 includes an oxide thin film transistor and a low temperature polysilicon thin film transistor connected in series; and/or the compensation circuit 12 includes an oxide thin film transistor and an low-temperature polysilicon thin-film transistor connected in series.

In the pixel circuit shown in FIG. 1, the compensation node and the driving control node N0 are the same node.

Optionally, the driving control node N0 may be a node electrically connected to the control terminal of the driving circuit in the pixel circuit, and the first node may be a node electrically connected to the second terminal of the driving circuit in the pixel circuit.

Optionally, the first voltage terminal may be a first low voltage terminal.

Figure 2:
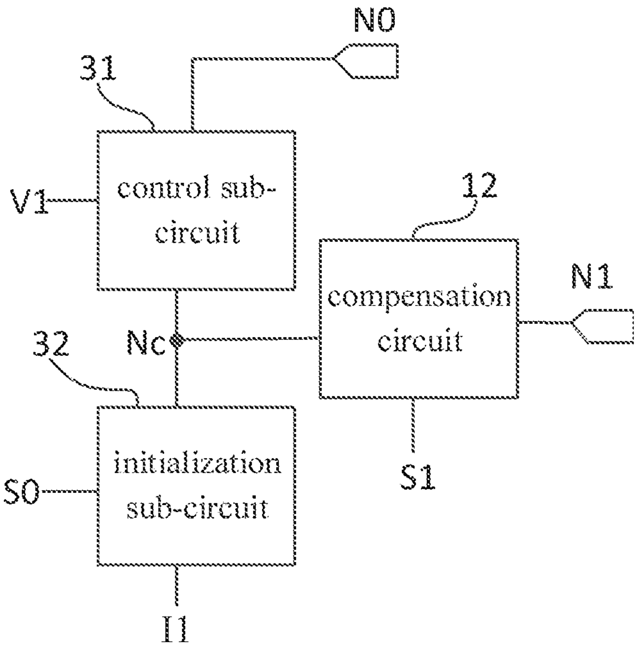
FIG. 2 is a structural diagram of a pixel circuit according to at least one embodiment of the present disclosure.

As shown in FIG. 2, the pixel circuit according to at least one embodiment of the present disclosure may include a first initialization circuit and a compensation circuit 12; the compensation node Nc and the driving control node N0 are different nodes; the first initialization circuit also is electrically connected to the first voltage terminal V1; the first initialization circuit includes a control sub-circuit 31 and an initialization sub-circuit 32;

The control sub-circuit 31 is electrically connected to the first voltage terminal V1, the driving control node N0 and the compensation node Nc, respectively, and is used to control the driving control node N0 to be connected to the compensation node Nc under the control of the first voltage signal provided by the first voltage terminal V1;

The initialization sub-circuit 32 is respectively electrically connected to the first initial control terminal S0, the first initial voltage terminal I1 and the compensation node Nc, and is used to write the first initial voltage provided by the first initial voltage terminal I1 into the compensation node Nc under the control of the first initial control signal;

The compensation circuit 12 is respectively electrically connected to the compensation control terminal S1, the compensation node Nc and the first node N1, and is used to control the compensation node Nc to be connected to the first node N1 under the control of the compensation control signal provided by the compensation control terminal S1.

In at least one embodiment of the pixel circuit shown in FIG. 2, the control sub-circuit 31 may include a low temperature polysilicon thin film transistor, and the initialization sub-circuit 32 may include an oxide thin film transistor.

When the pixel circuit shown in FIG. 2 of the present disclosure is in operation, the display period may include an initialization phase and a data writing-in phase that are set in sequence;

In the initialization phase, under the control of the first voltage signal, the control sub-circuit 31 controls the driving control node N0 to be connected to the compensation node Nc; the initialization sub-circuit 32 controls to write the first initial voltage provided by the first initial voltage terminal I1 into the compensation node Nc under the control of the first initial control signal, so as to control to write the first initial voltage into the driving control node N0;

In the data writing-in phase, under the control of the first voltage signal, the control sub-circuit 31 controls the driving control node N0 to be connected to the compensation node Nc, and the compensation circuit 12 controls the first node N1 to be connected to the compensation node Nc under the compensation control signal, so that the first node N1 is connected to the driving control node N0, so as to compensate the threshold voltage of the driving transistor in the driving circuit in the pixel circuit.

In at least one embodiment of the present disclosure, when the compensation node and the driving control node are the same node, the first initialization circuit may be further electrically connected to a first voltage terminal; the first initialization circuit may include a control sub-circuit and an initialization sub-circuit, where, The control sub-circuit is respectively electrically connected to the first voltage terminal, the first initial voltage terminal and the second node, and is configured to control to write the first initial voltage into the second node under the control of the first voltage signal provided by the first voltage terminal;

The initialization sub-circuit is respectively electrically connected to the first initial control terminal, the second node and the driving control node, and is configured to control the second node to be connected to the driving control node under the control of the first initial control signal.

In a specific implementation, the first initialization circuit may include a control sub-circuit and an initialization sub-circuit, the control sub-circuit writes the first initial voltage into the second node under the control of the first voltage signal, and the initialization sub-circuit controls the second node to be connected to the driving control node under the control of the first initial control signal, to control to write the first initial voltage into the driving control node.

Figure 3:
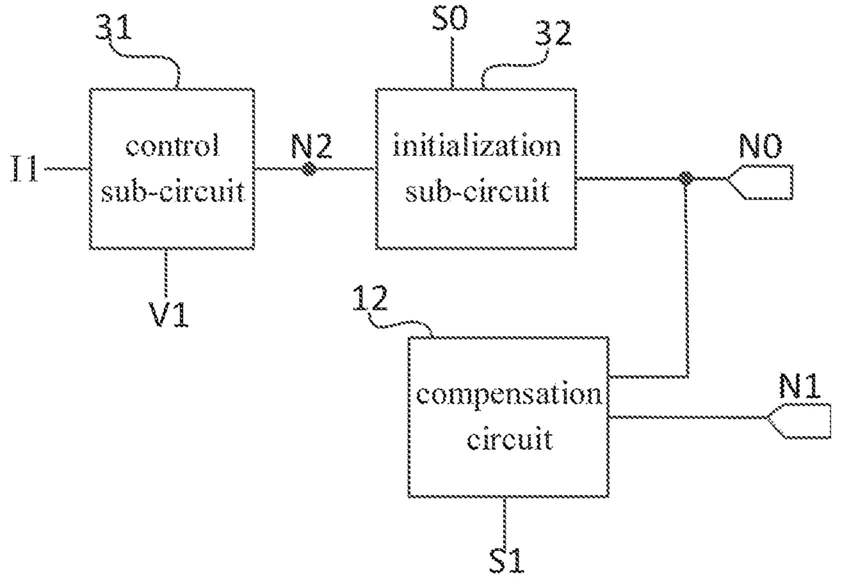
FIG. 3 is a structural diagram of a pixel circuit according to at least one embodiment of the present disclosure.

As shown in FIG. 3, on the basis of at least one embodiment of the pixel circuit shown in FIG. 1, the first initialization circuit may be further electrically connected to the first voltage terminal V1; the first initialization circuit 11 may include a control sub-circuit 31 and initialization sub-circuit 32, where, The control sub-circuit 31 is respectively electrically connected to the first voltage terminal V1, the first initial voltage terminal I1 and the second node N2, and is used to control to write the first initial voltage into the second node N2 under the control of the first voltage signal provided by the first voltage terminal V1;

The initialization sub-circuit 32 is respectively electrically connected to the first initial control terminal S0, the second node N2 and the driving control node N0, and is configured to control the second node N2 to be connected to the driving control node N0 under the control of the first initial control signal.

In the pixel circuit shown in FIG. 3, the control sub-circuit 31 may include low temperature polysilicon transistors, and the initialization sub-circuit 32 may include oxide thin film transistors.

When the pixel circuit shown in FIG. 3 of the present disclosure is in operation, the display period may include an initialization phase and a data writing-in phase that are set in sequence;

In the initialization phase, the control sub-circuit 31 controls to write the first initial voltage into the second node N2 under the control of the first voltage signal provided by the first voltage terminal V1; the initialization sub-circuit 32 controls the second node N2 to be connected to the driving control node N0 under the control of the first initial control signal;

In the data writing-in phase, under the control of the compensation control signal provided by the compensation control terminal S1, the compensation circuit 12 controls the driving control node N0 to be connected to the first node N1, to compensate the threshold voltage of the driving transistor in the pixel circuit.

Optionally, the control sub-circuit includes a first transistor, and the initialization sub-circuit includes a second transistor, wherein, A control electrode of the first transistor is electrically connected to the first voltage terminal, a first electrode of the first transistor is electrically connected to the first initial voltage terminal, and a second electrode of the first transistor is electrically connected to the second node;

A control electrode of the second transistor is electrically connected to the first initial control terminal, a first electrode of the second transistor is electrically connected to the second node, and a second electrode of the second transistor is electrically connected to the driving control node;

The first transistor is a low temperature polysilicon thin film transistor, and the second transistor is an oxide thin film transistor;

The first voltage terminal is a first low voltage terminal.

In a specific implementation, the first transistor may be a normally-on transistor.

In at least one embodiment of the present disclosure, when the compensation node and the driving control node are the same node, the first initialization circuit is further electrically connected to a first voltage terminal; the first initialization circuit includes a control sub-circuit and initialization sub-circuit, where, The control sub-circuit is respectively electrically connected to the first voltage terminal, the driving control node and the second node, and is configured to control the driving control node to be connected to the second node under the control of the first voltage signal provided by the first voltage terminal;

The initialization sub-circuit is respectively electrically connected to the first initial control terminal, the first initial voltage terminal and the second node, and is configured to control to write the first initial voltage into the second node under the control of the first initial control signal.

In a specific implementation, the first initialization circuit may include a control sub-circuit and an initialization sub-circuit, the control sub-circuit controls the driving control node to be connected to the second node under the control of the first voltage signal, and the initialization sub-circuit controls to write the first initial voltage into the second node under the control of an first initial control signal, so that the first initial voltage is written into the driving control node.

Figure 4:
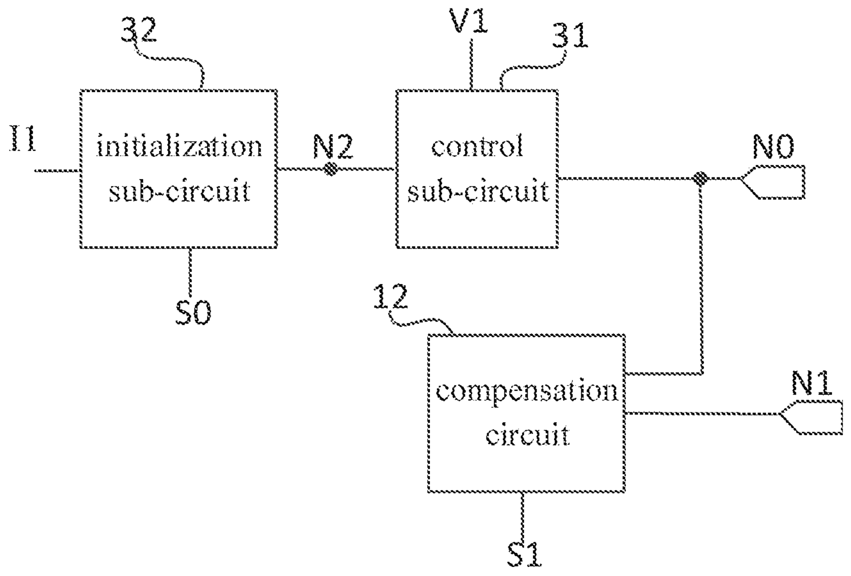
FIG. 4 is a structural diagram of a pixel circuit according to at least one embodiment of the present disclosure.

As shown in FIG. 4, on the basis of the pixel circuit shown in FIG. 1, the first initialization circuit may be further electrically connected to the first voltage terminal V1; the first initialization circuit includes a control sub-circuit 31 and an initialization sub-circuit 32, where, The control sub-circuit 31 is electrically connected to the first voltage terminal V1, the driving control node N0 and the second node N2, respectively, and is used to control the driving control node N0 to be connected to the second node N2 under the control of the first voltage signal provided by the first voltage terminal V1;

The initialization sub-circuit 32 is respectively electrically connected to the first initial control terminal S0, the first initial voltage terminal I1 and the second node N2, and is used to control to write the first initial voltage into the second node N2 under the control of the first initial control signal.

In the pixel circuit shown in FIG. 4, the control sub-circuit 31 may include a low temperature polysilicon thin film transistor, and the initialization sub-circuit 32 may include an oxide thin film transistor.

When the pixel circuit shown in FIG. 4 of the present disclosure is in operation, the display period may include an initialization phase and a data writing-in phase that are set in sequence;

In the initialization phase, the control sub-circuit 31 controls the driving control node N0 to be connected to the second node N2 under the control of the first voltage signal provided by the first voltage terminal V1; the initialization sub-circuit 32 control to write the first initial voltage into the second node N2 under the control of the first initial control signal;

In the data writing-in phase, under the control of the compensation control signal provided by the compensation control terminal S1, the compensation circuit 12 controls the driving control node N0 to be connected to the first node N1 to compensate the threshold voltage of the driving transistor in the pixel circuit.

Optionally, the control sub-circuit includes a first transistor, and the initialization sub-circuit includes a second transistor;

The control electrode of the first transistor is electrically connected to the first voltage terminal, the first electrode of the first transistor is electrically connected to the second node, and the second electrode of the first transistor is electrically connected to the driving control node;

The control electrode of the second transistor is electrically connected to the first initial control terminal, the first electrode of the second transistor is electrically connected to the first initial voltage terminal, and the second electrode of the second transistor is electrically connected to the second node;

The first transistor is a low temperature polysilicon thin film transistor, and the second transistor is an oxide thin film transistor;

The first voltage terminal is a first low voltage terminal.

In a specific implementation, the first transistor may be a normally-on transistor.

In at least one embodiment of the present disclosure, the compensation circuit is further electrically connected to the first voltage terminal, and the compensation circuit includes a first compensation sub-circuit and a second compensation sub-circuit;

The first compensation sub-circuit is electrically connected to a first voltage terminal, a compensation node and a third node respectively, and is configured to control the compensation node to be connected to the third node under the control of a first voltage signal provided by the first voltage terminal;

The second compensation sub-circuit is electrically connected to the compensation control terminal, the third node and the first node, respectively, and is configured to control the third node to be connected to the first node under the control of the compensation control signal.

In a specific implementation, the compensation circuit may include a first compensation sub-circuit and a second compensation sub-circuit, and the first compensation sub-circuit controls the compensation node to be connected to the third node under the control of the first voltage signal, under the control of the compensation control signal, the second compensation sub-circuit controls the third node to be connected to the first node, so as to control the compensation node to be connected to the first node.

Optionally, the first compensation sub-circuit may include a low temperature polysilicon thin film transistor, and the second compensation sub-circuit may include an oxide thin film transistor.

Figure 5:
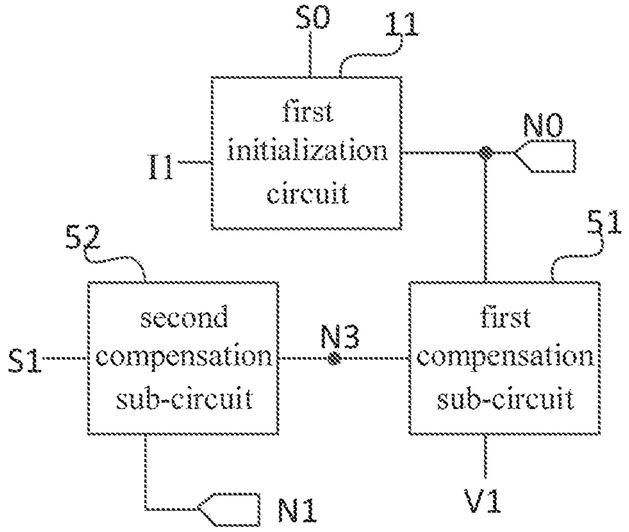
FIG. 5 is a structural diagram of a pixel circuit according to at least one embodiment of the present disclosure.

As shown in FIG. 5, based on the pixel circuit shown in FIG. 1, the compensation circuit is further electrically connected to the first voltage terminal V1, and the compensation circuit includes a first compensation sub-circuit 51 and a second compensation sub-circuit 52;

The first compensation sub-circuit 51 is respectively electrically connected to the first voltage terminal V1, the driving control node N0 and the third node N3, and is used to control the driving control node N0 to be connected to the third node N3 under the control of the first voltage signal provided by the first voltage terminal V1;

The second compensation sub-circuit 52 is electrically connected to the compensation control terminal S1, the third node N3 and the first node N1 respectively, and is configured to control the third node N3 to be connected to the first node N1 under the control of the compensation control signal.

In at least one embodiment shown in FIG. 5, the first compensation sub-circuit 51 may include a low temperature polysilicon thin film transistor, and the second compensation sub-circuit 52 may include an oxide thin film transistor.

During operation of the pixel circuit shown in FIG. 5 of the present disclosure, the display period may include an initialization phase and a data writing-in phase that are set in sequence;

In the initialization phase, the first initialization circuit 11 controls the first initial voltage terminal I1 to provide the first initial voltage to the driving control node N0 under the control of the first initial control signal provided by the first initial control terminal S0;

In the data writing-in phase, the first compensation sub-circuit 51 controls the driving control node N0 to be connected to the third node N3 under the control of the first voltage signal provided by the first voltage terminal V1; the under the control of the compensation control signal, the second compensation sub-circuit 52 controls the third node N3 to be connected to the first node N1, so as to control the first node N1 to be connected to the driving control node N0.

Optionally, the first compensation sub-circuit includes a third transistor, and the second compensation sub-circuit includes a fourth transistor;

A control electrode of the third transistor is electrically connected to the first voltage terminal, a first electrode of the third transistor is electrically connected to the compensation node, and a second electrode of the third transistor is electrically connected to the third node;

A control electrode of the fourth transistor is electrically connected to the compensation control terminal, a first electrode of the fourth transistor is electrically connected to the third node, and a second electrode of the fourth transistor is electrically connected to the first node;

The third transistor is an oxide thin film transistor, and the fourth transistor is a low temperature polysilicon thin film transistor.

In a specific implementation, the first voltage terminal may be a first low voltage terminal, and the third transistor may be a normally-on transistor.

In at least one embodiment of the present disclosure, the compensation circuit is further electrically connected to the first voltage terminal, and the compensation circuit includes a first compensation sub-circuit and a second compensation sub-circuit;

The first compensation sub-circuit is electrically connected to the first voltage terminal, the third node and the first node respectively, and is configured to control the third node to be connected to the first node under the control of the first voltage signal provided by the first voltage terminal;

The second compensation sub-circuit is electrically connected to the compensation control terminal, the third node and the compensation node respectively, and is configured to control the third node to be connected to the compensation node under the control of the compensation control signal.

In a specific implementation, the compensation circuit may include a first compensation sub-circuit and a second compensation sub-circuit, and the first compensation sub-circuit controls the third node to be connected to the first node under the control of the first voltage signal, the second compensation sub-circuit controls the third node to be connected to the compensation node under the control of the compensation control signal, so as to control the first node to be connected to the compensation node.

Figure 6:
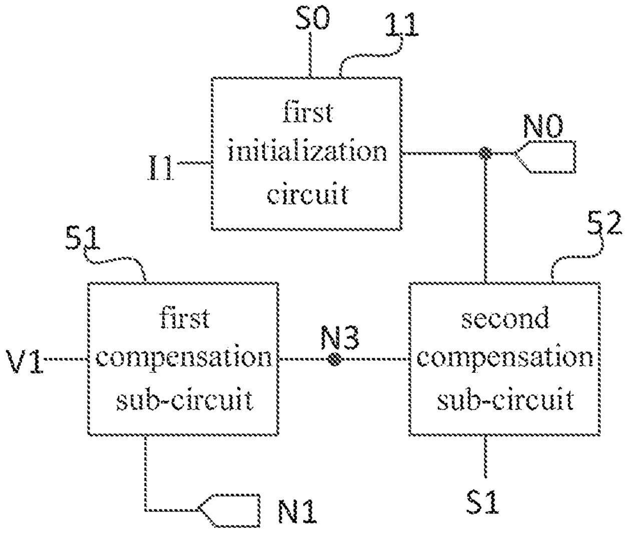
FIG. 6 is a structural diagram of a pixel circuit according to at least one embodiment of the present disclosure.

As shown in FIG. 6, based on the pixel circuit shown in FIG. 1, the compensation circuit is further electrically connected to the first voltage terminal V1, and the compensation circuit includes a first compensation sub-circuit 51 and a second compensation circuit 52;

The first compensation sub-circuit 51 is electrically connected to the first voltage terminal V1, the third node N3 and the first node N1 respectively, and is configured to control the third node N3 to be connected to the first node N1 under the control of the first voltage signal provided by the first voltage terminal V1;

The second compensation sub-circuit 52 is respectively electrically connected to the compensation control terminal S1, the third node N3 and the driving control node N0, and is configured to control the third node N3 to be connected to the driving control node N0 under the control of the compensation control signal.

In at least one embodiment shown in FIG. 6, the first compensation sub-circuit 51 may include a low temperature polysilicon thin film transistor, and the second compensation sub-circuit 52 may include an oxide thin film transistor.

When the pixel circuit shown in FIG. 6 of the present disclosure is in operation, the display period may include an initialization phase and a data writing-in phase that are set in sequence;

In the initialization phase, the first initialization circuit 11 controls the first initial voltage terminal I1 to provide the first initial voltage to the driving control node N0 under the control of the first initial control signal provided by the first initial control terminal S0;

In the data writing-in phase, the first compensation sub-circuit 51 controls the third node N3 to be connected to the first node N1 under the control of the first voltage signal provided by the first voltage terminal V2; the second compensation sub-circuit 52 controls the third node N3 to be connected to the driving control node N0 under the control of the compensation control signal, so as to control the first node N1 to be connected to the driving control node N0.

Optionally, the first compensation sub-circuit includes a third transistor, and the second compensation sub-circuit includes a fourth transistor;

A control electrode of the third transistor is electrically connected to the first voltage terminal, a first electrode of the third transistor is electrically connected to the third node, and a second electrode of the third transistor is electrically connected to the first node;

A control electrode of the fourth transistor is electrically connected to the compensation control terminal, a first electrode of the fourth transistor is electrically connected to the compensation node, and a second electrode of the fourth transistor is electrically connected to the third node;

The third transistor is an oxide thin film transistor, and the fourth transistor is a low temperature polysilicon thin film transistor.

Optionally, the pixel circuit described in at least one embodiment of the present disclosure may further include a light-emitting element, a driving circuit, a light-emitting control circuit, a data writing-in circuit, and an energy storage circuit, wherein, The data writing-in circuit is electrically connected to the data writing-in control terminal, the data line and the fourth node respectively, and is configured to control to write a data voltage provided by the data line into the fourth node under the control of the data writing-in control signal provided by the data writing-in control terminal;

The light-emitting control circuit is respectively electrically connected with the light-emitting control line, the second voltage terminal, the fourth node, the first node and the light-emitting element, and is configured to control the fourth node to be connected to the second voltage terminal under the control of the light-emitting control signal provided by the light-emitting control line, and control the first node to be connected to the light-emitting element;

A first terminal of the energy storage circuit is electrically connected to the driving control node, a second terminal of the energy storage circuit is electrically connected to the second voltage terminal, and the energy storage circuit is used for storing electrical energy;

The driving circuit is electrically connected to a driving control node, a fourth node and a first node respectively, and is configured to generate a driving current flowing from the fourth node to the first node under the control of the potential of the driving control node.

In at least one embodiment of the present disclosure, the pixel circuit may include a light-emitting element, a driving circuit, a light-emitting control circuit, a data writing-in circuit, and an energy storage circuit, the light-emitting control circuit is used for light-emitting control, and the data writing-in circuit is used to write the data voltage, the energy storage circuit is used to maintain the potential of the driving control node, and the driving circuit generates a driving current flowing from the fourth node to the first node under the control of the potential of the driving control node.

Optionally, the light-emitting element may be an organic light-emitting diode.

Optionally, the second voltage terminal may be a high voltage terminal.

In at least one embodiment of the present disclosure, the pixel circuit may further include a second initialization circuit;

The second initialization circuit is respectively electrically connected to the data writing-in control terminal, the second initial voltage terminal and the first electrode of the light-emitting element, and is used to control to write the second initial voltage provided by the second initial voltage terminal into the first electrode of the light-emitting element under the control of the data writing-in control signal;

A second electrode of the light-emitting element is electrically connected to a third voltage terminal.

Optionally, the third voltage terminal may be a second low voltage terminal.

Optionally, the pixel circuit further includes a second initialization circuit, and the second initialization circuit writes a second initial voltage into the first electrode of the light-emitting element under the control of the data writing-in control signal to clear the charge remained in the first electrode of the light-emitting element and control the light-emitting element not to emit light.

Optionally, the first initial voltage and the second initial voltage may be the same, but not limited thereto.

Figure 7:
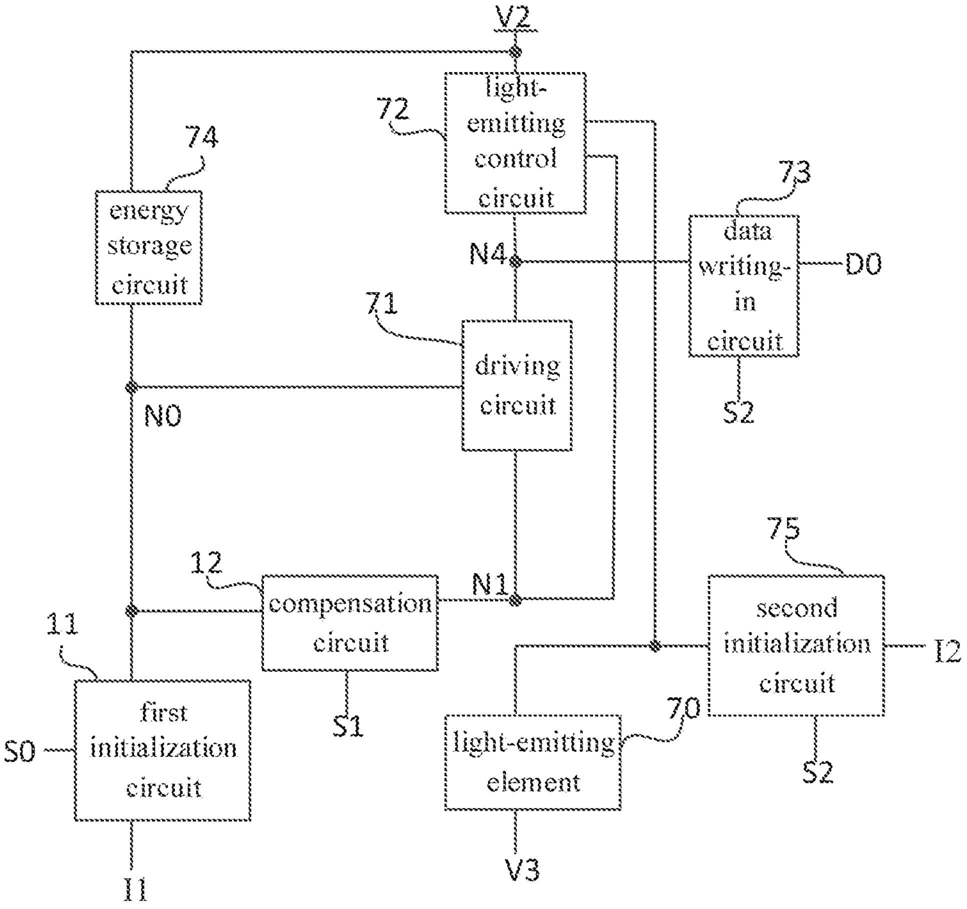
FIG. 7 is a structural diagram of a pixel circuit according to at least one embodiment of the present disclosure.

As shown in FIG. 7, on the basis of the pixel circuit shown in FIG. 1, the pixel circuit may further include a light-emitting element 70, a driving circuit 71, a light-emitting control circuit 72, a data writing-in circuit 73, an energy storage circuit 74 and a second initialization circuit 75, wherein, The data writing-in circuit 73 is respectively electrically connected to the data writing-in control terminal S2, the data line D0 and the fourth node N4, and is used to control to write the data voltage provided by the data line D0 into the fourth node N4 under the control of the data writing-in control signal provided by the data writing-in control terminal S2;

The light-emitting control circuit 72 is respectively electrically connected to the light-emitting control line E1, the second voltage terminal V2, the fourth node N4, the first node N1 and the light-emitting element 70, and is used to control the fourth node N4 to be connected to the second voltage terminal V2 under the control of light-emitting control signal provided on the light-emitting control line E1, and control the first node N1 to be connected to the first electrode of the light-emitting element 70;

The first terminal of the energy storage circuit 74 is electrically connected to the driving control node N0, the second terminal of the energy storage circuit 74 is electrically connected to the second voltage terminal V2, and the energy storage circuit 74 is used for storing electrical energy;

The driving circuit 71 is respectively electrically connected to the driving control node N0, the fourth node N4 and the first node N1, and is used to generate a driving current flowing from the fourth node N4 to the first node N1 under the control of the potential of the driving control node N0;

The second initialization circuit 75 is respectively electrically connected to the data writing-in control terminal S2, the second initial voltage terminal I2 and the first electrode of the light-emitting element 70, and is configured to control to write the second initial voltage provided by the second initial voltage terminal I2 into the first electrode of the light-emitting element 70 under the control of the data writing-in control signal;

The second electrode of the light-emitting element 70 is electrically connected to the third voltage terminal V3.

When the pixel circuit shown in FIG. 7 of the present disclosure is in operation, the display period may include an initialization phase, a data writing-in phase, and a light-emitting phase that are set in sequence;

In the initialization phase, the first initialization circuit 11 controls the first initial voltage terminal I1 to provide the first initial voltage to the driving control node N0 under the control of the first initial control signal provided by the first initial control terminal S0;

In the data writing-in phase, the data writing-in circuit 73 controls to write the data voltage provided by the data line D0 into the fourth node N4 under the control of the data writing-in control signal provided by the data writing-in control terminal S2; under the control of the compensation control signal provided by the compensation control terminal S1, the compensation circuit controls the driving control node N0 to be connected to the first node N1, so as to control the driving circuit 71 to connect the fourth node N4 and the first node N1 when the data writing-in phase starts, charge the energy storage circuit 74 through the data voltage to change the potential of the driving control node N0 until the driving circuit 71 disconnects N4 from N1, at this time the potential of N0 is related to the data voltage and the threshold voltage of the driving transistor in the driving circuit 71, so as to compensate the threshold voltage of the driving transistor;

In the light-emitting phase, the light-emitting control circuit 72 controls the fourth node N4 to be connected to the second voltage terminal V2 under the control of the light-emitting control signal provided by the light-emitting control line E1, and controls the first node N1 to be connected to the first electrode of the light-emitting element 70, and the driving circuit 71 generates a driving current flowing from the fourth node N4 to the first node N1 under the control of the potential of the driving control node N0, to drive the light-emitting element 70 to emit light.

Optionally, the driving circuit includes a driving transistor, the light-emitting control circuit includes a fifth transistor and a sixth transistor, the data writing-in circuit includes a seventh transistor, and the energy storage circuit includes a storage capacitor, wherein, A control electrode of the driving transistor is electrically connected to the driving control node, a first electrode of the driving transistor is electrically connected to the fourth node, and a second electrode of the driving transistor is electrically connected to the first node;

A control electrode of the fifth transistor is electrically connected to the light-emitting control line, a first electrode of the fifth transistor is electrically connected to the second voltage terminal, and a second electrode of the fifth transistor is electrically connected to the fourth node;

A control electrode of the sixth transistor is electrically connected to the light-emitting control line, a first electrode of the sixth transistor is electrically connected to the first node, and a second electrode of the sixth transistor is electrically connected to the light-emitting element;

A control electrode of the seventh transistor is electrically connected to the data writing-in control terminal, a first electrode of the seventh transistor is electrically connected to the data line, and a second electrode of the seventh transistor is electrically connected to the fourth node;

A first terminal of the storage capacitor is electrically connected to the driving control node, and a second terminal of the storage capacitor is electrically connected to the second voltage terminal.

Optionally, the driving transistor, the fifth transistor, the sixth transistor and the seventh transistor are all low temperature polysilicon thin film transistors.

Optionally, the second initialization circuit includes an eighth transistor;

A control electrode of the eighth transistor is electrically connected to the data writing-in control terminal, a first electrode of the eighth transistor is electrically connected to the second initial voltage terminal, and a second electrode of the eighth transistor is electrically connected to the first electrode of the light-emitting element;

The eighth transistor is a low temperature polysilicon thin film transistor.

Figure 8:
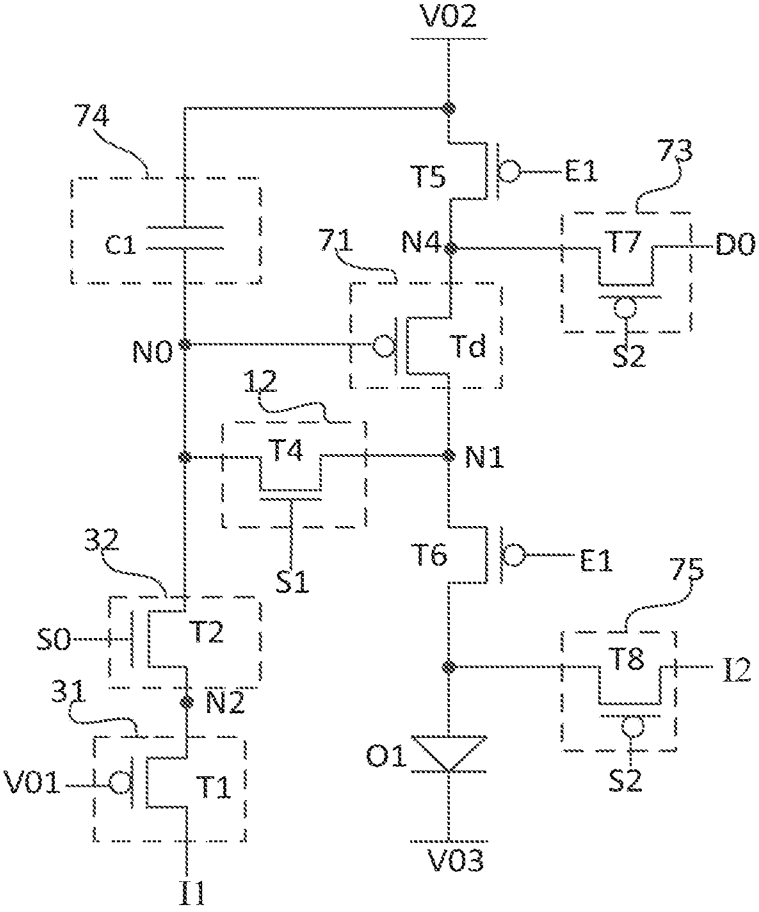
FIG. 8 is a circuit diagram of a pixel circuit according to at least one embodiment of the present disclosure.

As shown in FIG. 8, based on the pixel circuit shown in FIG. 7, the light-emitting element is an organic light-emitting diode O1;

The driving circuit 71 includes a driving transistor Td, the lighting control circuit includes a fifth transistor T5 and a sixth transistor T6, the data writing-in circuit 73 includes a seventh transistor T7, the energy storage circuit 74 includes a storage capacitor C1, the second initialization circuit 75 includes an eighth transistor T8;

The first initialization circuit includes a control sub-circuit 31 and an initialization sub-circuit 32, wherein the control sub-circuit 31 includes a first transistor T1, the initialization sub-circuit 32 includes a second transistor T2; the compensation circuit 12 includes a fourth transistor T4;

The gate electrode of the first transistor T1 is electrically connected to the first low voltage terminal, the source electrode of the first transistor T1 is electrically connected to the first initial voltage terminal I1, and the drain electrode of the first transistor T1 is electrically connected to the second node N2; the first low voltage terminal is used for providing the first low voltage signal V01;

The gate electrode of the second transistor T2 is electrically connected to the first initial control terminal S0, the drain electrode of the second transistor T2 is electrically connected to the second node N2, and the source electrode of the second transistor T2 is electrically connected to the driving control node N0;

The gate electrode of the fourth transistor T4 is electrically connected to the compensation control terminal S1, the drain electrode of the fourth transistor T4 is electrically connected to the driving control node N0, and the source electrode of the fourth transistor T4 is electrically connected to the first Node N1;

The gate electrode of the driving transistor Td is electrically connected to the driving control node N0, the source electrode of the driving transistor Td is electrically connected to the fourth node N4, and the drain electrode of the driving transistor Td is electrically connected to the first node N1;

The gate electrode of the fifth transistor T5 is electrically connected to the light-emitting control line E1, the source electrode of the fifth transistor T5 is electrically connected to the high voltage terminal, and the drain electrode of the fifth transistor T5 is electrically connected to the fourth node N4; the high voltage terminal is used to provide a high voltage signal V02;

The gate electrode of the sixth transistor T6 is electrically connected to the light-emitting control line E1, the source electrode of the sixth transistor T6 is electrically connected to the first node N1, and the drain electrode of the sixth transistor T6 is electrically connected to an anode;

The gate electrode of the seventh transistor T7 is electrically connected to the data writing-in control terminal S2, the source electrode of the seventh transistor T7 is electrically connected to the data line D0, and the drain electrode of the seventh transistor T7 is electrically connected to the fourth node N4;

The first terminal of the storage capacitor C1 is electrically connected to the driving control node N0, and the second terminal of the storage capacitor C1 is electrically connected to the high voltage terminal;

The gate electrode of the eighth transistor T8 is electrically connected to the data writing-in control terminal S2, the source electrode of the eighth transistor T8 is electrically connected to the second initial voltage terminal I2, and the drain electrode of the eighth transistor T8 is electrically connected to the anode of O1;

The cathode of O1 is electrically connected to a second low voltage terminal, and the second low voltage terminal is used for providing a second low voltage signal V03.

In the pixel circuit shown in FIG. 8, the first voltage terminal may be a first low voltage terminal, the second voltage terminal may be a high voltage terminal, the third voltage terminal may be a second low voltage terminal, and the first initial voltage terminal and the second initial voltage terminal may be the same.

In the pixel circuit shown in FIG. 8, T2 and T4 are oxide thin film transistors, and Td, T1, T5, T6, T7 and T8 are all low temperature polysilicon thin film transistors;

T2 and T4 are n-type transistors, and Td, T1, T5, T6, T7 and T8 are all p-type transistors.

When the pixel circuit shown in FIG. 8 is in operation, the initialization of N0 is completed by T1 and T2, wherein T1 is a low temperature polysilicon thin film transistor, and T2 is an oxide thin film transistor.

In at least one embodiment shown in FIG. 8, the voltage value of the first initial voltage provided by I1 may be greater than the voltage value of the second initial voltage provided by I2, and there are two transistors in the first current leakage path from N0 to I1, there are three transistors in the second current leakage path from N0 to I2, the voltage value of the first initial voltage is set to be greater than the voltage value of the second initial voltage (for example, the voltage value of the first initial voltage can be about −2.2 V, the voltage value of the second initial voltage can be about −2.5V), so that the voltage difference between the driving control node N0 and the first initial voltage terminal I1 is small, and the current leakage phenomenon is improved;

When the pixel circuit is in the high-brightness display mode, since the voltage value of the second low voltage signal is correspondingly reduced to achieve high brightness, the voltage value of the second initial voltage can also be correspondingly reduced (at this time, the voltage value of the second initial voltage may be related to the voltage value of the second low voltage signal), and the voltage value of the first initial voltage may be greater than the voltage value of the second initial voltage, so as to reduce or minimize the leakage current from N0 to I1;

When the pixel circuit is in the low-brightness display mode, since the voltage value of the second low voltage signal is correspondingly increased to achieve low brightness, the voltage value of the second initial voltage can also be correspondingly increased (at this time, the voltage value of the second initial voltage may be related to the voltage value of the second low voltage signal), the voltage value of the second initial voltage may be greater than the voltage value of the first initial voltage, and the leakage current from the driving control node to the second initial voltage terminal decreases accordingly.

In at least one embodiment of the present disclosure, “about −2.2V” may refer to: greater than or equal to −2.3V and less than or equal to −2.1V, but not limited thereto;

“About −2.5V” may refer to: greater than or equal to −2.6V and less than or equal to −2.4V, but not limited thereto.

Figure 9:
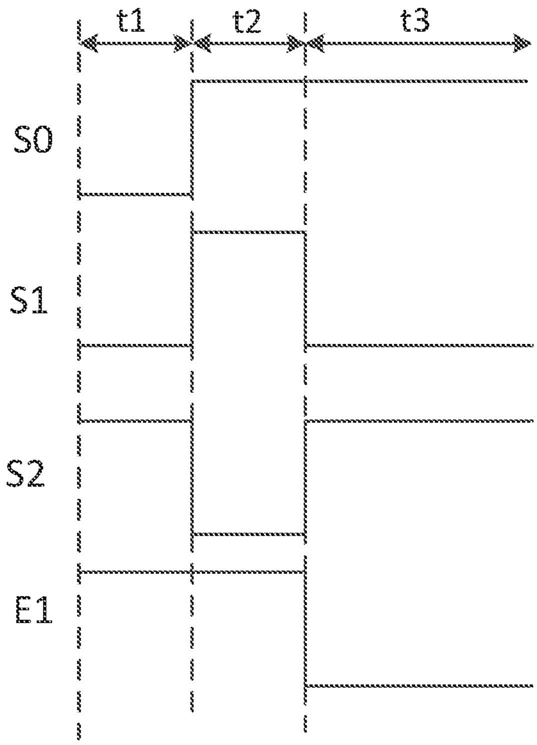
FIG. 9 is a working timing diagram of the pixel circuit according to at least one embodiment of the present disclosure.

As shown in FIG. 9, when the pixel circuit shown in FIG. 8 of the present disclosure is in operation, the display period may include an initialization phase t1, a data writing-in phase t2 and a light-emitting phase t3 that are set in sequence;

In the initialization phase t1, S0 provides a low voltage signal, and T1 and T2 are turned on to provide the first initial voltage provided by I1 to N0, so that Td can be turned on when the data writing-in phase starts;

In the initialization phase t1, S1 provides a low voltage signal, T4 is turned off, S2 and E1 provide a high voltage signal, and T5, T6, T7 and T8 are all turned off;

In the data writing-in phase t2, S0 provides a high voltage signal, T1 is turned on, T2 is turned off, S1 provides a high voltage signal, T4 is turned on, S2 provides a low voltage signal, and the data voltage Vd provided by D0 is written into N4 through T7;

At the beginning of the data writing-in phase t2, Td is turned on to charge C1 through the data voltage Vd, and the potential of N0 is increased until the potential of N0 becomes Vd+Vth, Td is turned off, and Vth is the threshold voltage of Td;

In the data writing-in phase t2, S2 provides a low voltage signal, and T8 is turned on to write the second initial voltage provided by I2 into the anode of O1, to clear the charge remained at the anode of O1; E1 provides a high voltage signal, both T5 and T6 are turned off;

In the light-emitting phase t3, S0 provides a high voltage signal, S1 provides a low voltage signal, T1 is turned on, T2 is turned off, T4 is turned off, S2 provides a high voltage signal, E1 provides a low voltage signal, T7 and T8 are both turned off, Td, T5 and T6 are both turned on, Td drives O1 to emit light.

Differences between at least one embodiment of the pixel circuit shown in FIG. 10 and at least one embodiment of the pixel circuit shown in FIG. 8 are as follows:

The source electrode of the first transistor T1 is electrically connected to the second node N2, and the drain electrode of the first transistor T1 is electrically connected to the driving control node N0;

The drain electrode of the second transistor T2 is electrically connected to the first initial voltage terminal I1, and the source electrode of the second transistor T2 is electrically connected to the second node N2.

Figure 10:
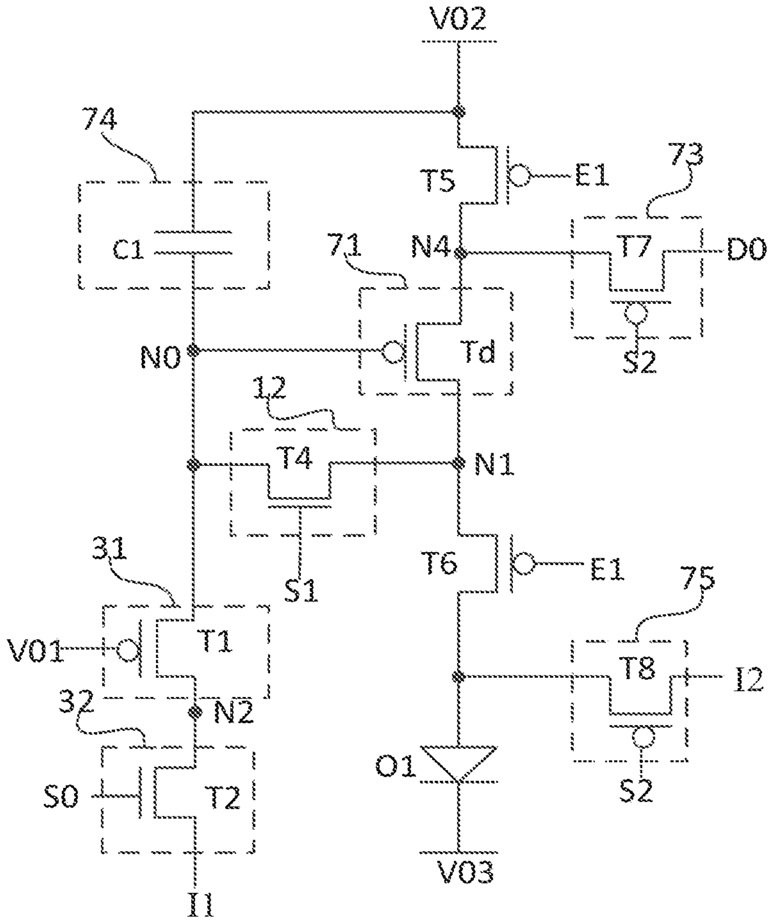
FIG. 10 is a circuit diagram of a pixel circuit according to at least one embodiment of the present disclosure.

In at least one embodiment of the pixel circuit shown in FIG. 10, T2 and T4 are oxide thin film transistors, and Td, T1, T5, T6, T7 and T8 are all low temperature polysilicon thin film transistors;

T2 and T4 are n-type transistors, and Td, T1, T5, T6, T7 and T8 are all p-type transistors.

When at least one embodiment of the pixel circuit shown in FIG. 10 is in operation, the initialization of N0 is completed by T1 and T2, wherein T1 is a low temperature polysilicon thin film transistor, and T2 is an oxide thin film transistor.

Moreover, in at least one embodiment of the pixel circuit shown in FIG. 10, T1 is a normally-on transistor, so that T2 is protected; when the potential of N0 jumps, voltage division may be performed by T1 to prevent the gate-source voltage of T2 from being too large. At the same time, T1 is equivalent to a stable metal-oxide-semiconductor (MOS) capacitor, which can effectively stabilize the potential of N0 and prevent the potential of N0 from being affected by the potential of N1, the potential of N4 and the signal line (for example, the signal line can be S0, S1 and S2), and flicker can be improved especially at low frequencies.

In at least one embodiment of the pixel circuit shown in FIG. 10, $$\Delta V(N0)=V(N0)\times C0_z/(C1_z+Cm+Cq);$$

Among them, ΔV(N0) is a variation of the potential of N0, C0*z* is the capacitance value of a capacitor formed between N0 and N4, C1z is the capacitance value of C1, and Cm is the capacitance value of a parasitic capacitor between the gate electrode of T1 and N0, Cq is the capacitance value of a capacitance formed between N0 and a node other than N4; V(N0) is the potential of N0.

In at least one embodiment shown in FIG. 10, the voltage value of the first initial voltage provided by I1 may be greater than the voltage value of the second initial voltage provided by I2, and there are two transistors in the first current leakage path from N0 to I1, there are three transistors in the second current leakage path from N0 to I2, the voltage value of the first initial voltage is set to be greater than the voltage value of the second initial voltage (for example, the voltage value of the first initial voltage can be about −2.2 V, the voltage value of the second initial voltage can be about −2.5V), so that the voltage difference between the driving control node N0 and the first initial voltage terminal I1 is small, and the current leakage phenomenon is improved;

When the pixel circuit is in the high-brightness display mode, since the voltage value of the second low voltage signal is correspondingly reduced to achieve high brightness, the voltage value of the second initial voltage can also be correspondingly reduced (at this time, the voltage value of the second initial voltage may be related to the voltage value of the second low voltage signal), and the voltage value of the first initial voltage may be greater than the voltage value of the second initial voltage, so as to reduce or minimize the leakage current from N0 to I1;

When the pixel circuit is in the low-brightness display mode, since the voltage value of the second low voltage signal is correspondingly increased to achieve low brightness, the voltage value of the second initial voltage can also be correspondingly increased (at this time, the voltage value of the second initial voltage may be related to the voltage value of the second low voltage signal), the voltage value of the second initial voltage may be greater than the voltage value of the first initial voltage, and the leakage current from the driving control node to the second initial voltage terminal decreases accordingly.

Figure 11:
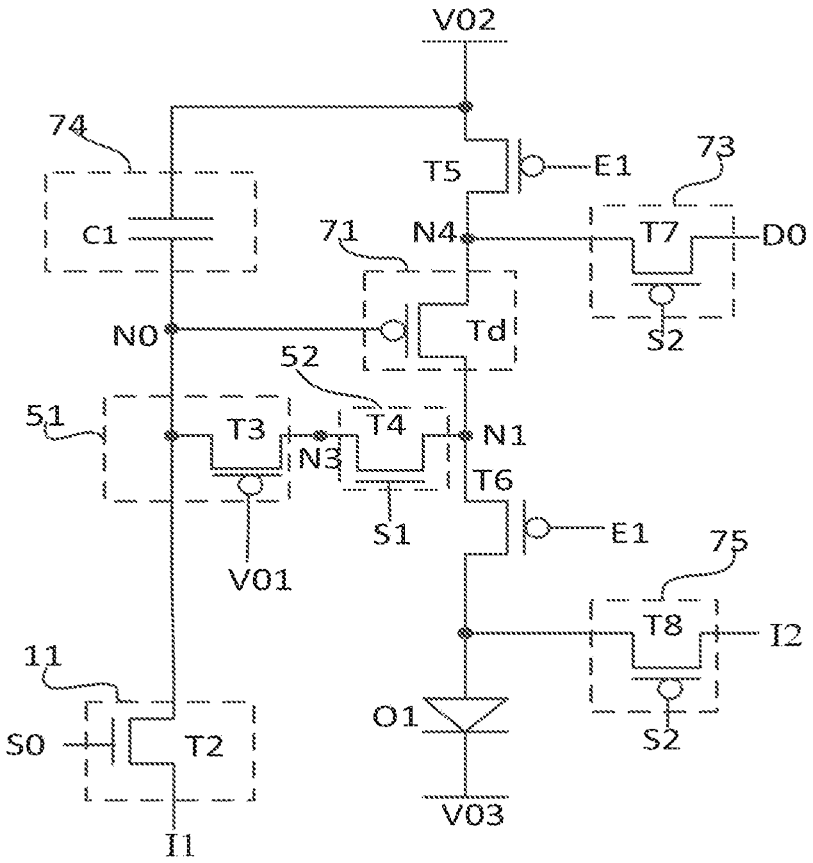
FIG. 11 is a circuit diagram of a pixel circuit according to at least one embodiment of the present disclosure.

As shown in FIG. 11, based on at least one embodiment of the pixel circuit shown in FIG. 7, the light-emitting element is an organic light-emitting diode O1;

The driving circuit 71 includes a driving transistor Td, the light emitting control circuit 72 includes a fifth transistor T5 and a sixth transistor T6, the data writing-in circuit 73 includes a seventh transistor T7, and the energy storage circuit 74 includes a storage capacitor C1, the second initialization circuit 75 includes an eighth transistor T8;

The first initialization circuit 11 includes a second initialization transistor T2; the compensation circuit includes a first compensation sub-circuit 51 and a second compensation sub-circuit 52; the first compensation sub-circuit 51 includes a third transistor T3, and the second compensation sub-circuit 52 includes a fourth transistor T4;

The gate electrode of the second transistor T2 is electrically connected to the first initial control terminal S0, the drain electrode of the second transistor T2 is electrically connected to the first initial voltage terminal I1, and the source electrode of the second transistor T2 is electrically connected to the driving control node N0;

The gate electrode of the third transistor T3 is electrically connected to the first low voltage terminal, the source electrode of the third transistor T3 is electrically connected to the driving control node N0, and the drain electrode of the third transistor T3 is electrically connected to the third node N3; the first low voltage terminal is used to provide the first low voltage signal V01;

The gate electrode of the fourth transistor T4 is electrically connected to the compensation control terminal S1, the drain electrode of the fourth transistor T4 is electrically connected to the third node N3, and the source electrode of the fourth transistor T4 is electrically connected to the first node N1;

The gate electrode of the driving transistor Td is electrically connected to the driving control node N0, the source electrode of the driving transistor Td is electrically connected to the fourth node N4, and the drain electrode of the driving transistor Td is electrically connected to the first node N1;

The gate electrode of the fifth transistor T5 is electrically connected to the light-emitting control line E1, the source electrode of the fifth transistor T5 is electrically connected to the high voltage terminal, and the drain electrode of the fifth transistor T5 is electrically connected to the fourth node N4; the high voltage terminal is used to provide a high voltage signal V02;

The gate electrode of the sixth transistor T6 is electrically connected to the light-emitting control line E1, the source electrode of the sixth transistor T6 is electrically connected to the first node N1, and the drain electrode of the sixth transistor T6 is electrically connected to the anode of O1;

The control electrode of the seventh transistor T7 is electrically connected to the data writing-in control terminal S2, the source electrode of the seventh transistor T7 is electrically connected to the data line D0, and the drain electrode of the seventh transistor T7 is electrically connected to the fourth node N4;

The first terminal of the storage capacitor C1 is electrically connected to the driving control node N0, and the second terminal of the storage capacitor is electrically connected to the high voltage terminal;

The gate electrode of the eighth transistor T8 is electrically connected to the data writing-in control terminal S2, the source electrode of the eighth transistor T8 is electrically connected to the second initial voltage terminal I2, and the drain electrode of the eighth transistor T8 is electrically connected to the anode of O1;

The cathode of O1 is electrically connected to the second low voltage terminal, and the second low voltage terminal is used for providing the second low voltage signal V03.

In at least one embodiment of the pixel circuit shown in FIG. 11, the first voltage terminal may be a first low voltage terminal, the second voltage terminal may be a high voltage terminal, the third voltage terminal may be a second low voltage terminal, and the first initial voltage terminal and the second initial voltage terminal may be the same.

In at least one embodiment of the pixel circuit shown in FIG. 11, T2 and T4 may be oxide thin film transistors, and T3, Td, T5, T6, T7 and T8 may all be low temperature polysilicon thin film transistors;

T2 and T4 are n-type transistors, and T3, Td, T5, T6, T7 and T8 are all p-type transistors.

In at least one embodiment of the pixel circuit shown in FIG. 11, T3 is a normally-on transistor, so as to protect T4; when the potential of N0 jumps, voltage division may be implemented by T3 to prevent the gate-source voltage of T4 from being too large; at the same time, T3 is equivalent to a stable MOS capacitor, which can effectively stabilize the potential of N0 and prevent the potential of N0 from being affected by the potential of N1, the potential of N4 and the signal line (for example, the signal line can be S0, S1 and S2), which can improve flicker especially at low frequencies.

In at least one embodiment shown in FIG. 11, since the first current leakage path from N0 to I1 includes only one low-temperature polysilicon thin film transistor, the leakage current of the current leakage path from N0 to I1 needs to be reduced, and the voltage value of the first initial voltage can be set to be greater than the voltage value of the second initial voltage. For example, the voltage value of the first initial voltage may be about −2.2V (in at least one embodiment of the present disclosure, "about −2.2V" may refer to greater than or equal to −2.3V but less than or equal to −2.1V, but not limited thereto), the voltage value of the second initial voltage may be about −2.5V (in at least one embodiment of the present disclosure, "about −2.5V" refers to greater than or equal to −2.6V and less than or equal to −2.4V, but not limited thereto);

When the pixel circuit is in the high-brightness display mode, since the voltage value of the second low voltage signal is correspondingly reduced to achieve high brightness, the voltage value of the second initial voltage can also be correspondingly reduced (at this time, the voltage value of the second initial voltage may be related to the voltage value of the second low voltage signal), and the voltage value of the first initial voltage may be greater than the voltage value of the second initial voltage, so as to reduce or minimize the leakage current from N0 to I1;

When the pixel circuit is in the low-brightness display mode, since the voltage value of the second low voltage signal is correspondingly increased to achieve low brightness, the voltage value of the second initial voltage can also be correspondingly increased (at this time, the voltage value of the second initial voltage may be related to the voltage value of the second low voltage signal), the voltage value of the second initial voltage may be greater than the voltage value of the first initial voltage, and the leakage current from the driving control node to the second initial voltage terminal decreases accordingly.

When at least one embodiment of the pixel circuit shown in FIG. 11 is in operation, the threshold voltage of the driving transistor Td is compensated by T3 and T4, wherein T3 is a low temperature polysilicon thin film transistor and T4 is an oxide thin film transistor.

As shown in FIG. 9, when at least one embodiment of the pixel circuit shown in FIG. 11 of the present disclosure is in operation, a display period may include an initialization phase t1, a data writing-in phase t2 and a light-emitting phase t3 that are set in sequence;

In the initialization phase t1, S0 provides a low voltage signal, and T2 is turned on to provide the first initial voltage provided by I1 to N0, so that Td can be turned on when the data writing-in phase starts;

In the initialization phase t1, T3 is turned on, S1 provides a low voltage signal, T4 is turned off, S2 and E1 provide a high voltage signal, and T5, T6, T7 and T8 are all turned off;

In the data writing-in phase t2, S0 provides a high voltage signal, T2 is turned off, T3 is turned on, S1 provides a high voltage signal, T4 is turned on, S2 provides a low voltage signal, and the data voltage Vd provided by D0 is written into N4 through T7;

At the beginning of the data writing-in phase t2, Td is turned on to charge C1 through the data voltage Vd, and the potential of N0 is increased until the potential of N0 becomes Vd+Vth, Td is turned off, and Vth is the threshold voltage of Td;

In the data writing-in phase t2, S2 provides a low voltage signal, and T8 is turned on to write the second initial voltage provided by I2 into the anode of O1 to clear the charge remaining at the anode of O1; E1 provides a high voltage signal, both T5 and T6 turn off;

In the light-emitting phase t3, S0 provides a high voltage signal, S1 provides a low voltage signal, T2 is turned off, T3 is turned on, T4 is turned off, S2 provides a high voltage signal, E1 provides a low voltage signal, T7 and T8 are both turned off, Td, T5 and T6 are all turned on, Td drives O1 to emit light.

Differences between at least one embodiment of the pixel circuit shown in FIG. 12 and at least one embodiment of the pixel circuit shown in FIG. 11 are as follows:

The source electrode of the third transistor T3 is electrically connected to the third node N3, and the drain electrode of the third transistor T3 is electrically connected to the first node N1;

The drain electrode of the fourth transistor T4 is electrically connected to the driving control node N0, and the source electrode of the fourth transistor T4 is electrically connected to the third node N3.

Figure 12:
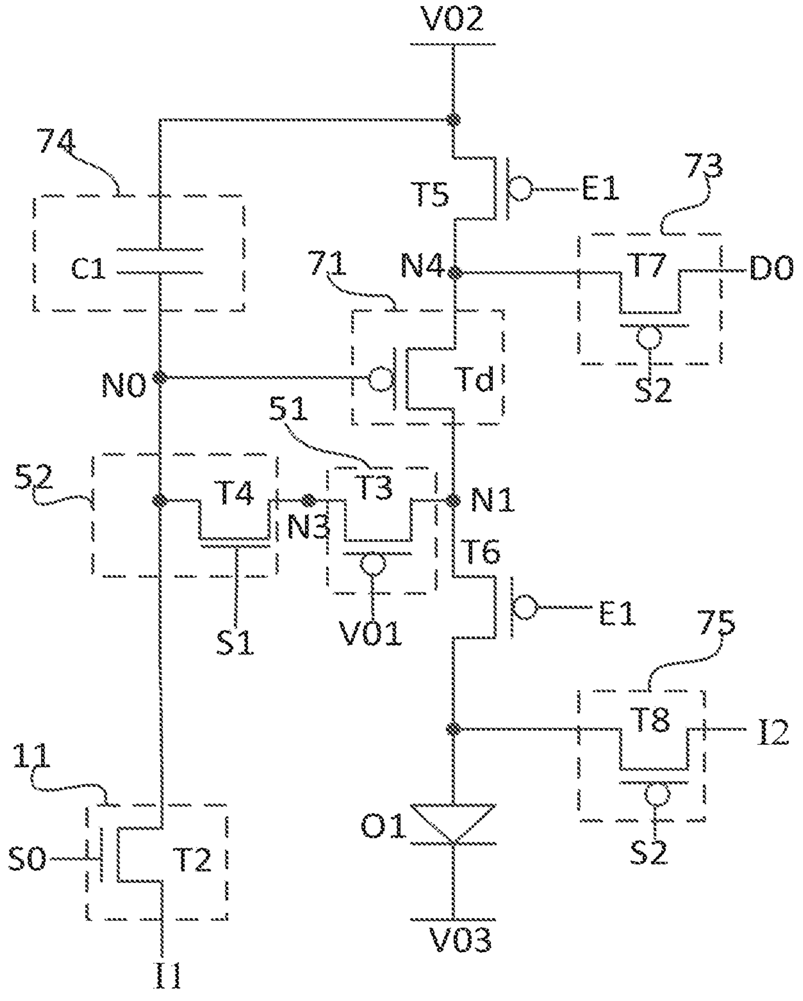
FIG. 12 is a circuit diagram of a pixel circuit according to at least one embodiment of the present disclosure.

In at least one embodiment of the pixel circuit shown in FIG. 12, T2 and T4 may be oxide thin film transistors, and T3, Td, T5, T6, T7 and T8 may all be low temperature polysilicon thin film transistors;

T2 and T4 are n-type transistors, and T3, Td, T5, T6, T7 and T8 are all p-type transistors.

When at least one embodiment of the pixel circuit shown in FIG. 12 is in operation, the threshold voltage of the driving transistor Td is compensated by T3 and T4, wherein T3 is a low temperature polysilicon thin film transistor and T4 is an oxide thin film transistor.

In at least one embodiment of the pixel circuit shown in FIG. 12,

Since the first current leakage path from N0 to I1 only includes one low temperature polysilicon thin film transistor, it is necessary to reduce the leakage current of the current leakage path from N0 to I1, and the voltage value of the first initial voltage can be set to be greater than the second initial voltage. For example, the voltage value of the first initial voltage may be about −2.2V (in at least one embodiment of the present disclosure, "about −2.2V" may refer to greater than or equal to −2.3V and less than or equal to −2.1 V, but not limited thereto), the voltage value of the second initial voltage may be about −2.5V (in at least one embodiment of the present disclosure, "about −2.5V" may refer to greater than or equal to −2.6V and less than or equal to −2.4V, but not limited to);

When the pixel circuit is in the high-brightness display mode, since the voltage value of the low-voltage signal provided by the low-voltage terminal V3 is correspondingly reduced to achieve high brightness, the voltage value of the second initial voltage can also be correspondingly reduced (at this time the voltage value of the second initial voltage may be related to the voltage value of the low voltage signal provided by V3), and the voltage value of the first initial voltage may be greater than the voltage value of the second initial voltage to reduce or minimize the leakage current from N0 to I1;

When the pixel circuit is in the low-brightness display mode, since the voltage value of the low-voltage signal provided by the low-voltage terminal V3 is correspondingly increased to achieve low brightness, the voltage value of the second initial voltage can also be correspondingly increased (the voltage value of the second initial voltage may be related to the voltage value of the low voltage signal provided by V3), and the voltage value of the second initial voltage may be greater than the voltage value of the first initial voltage, the leakage current from the driving control node to the second initial voltage terminal decreased accordingly.

Figure 13:
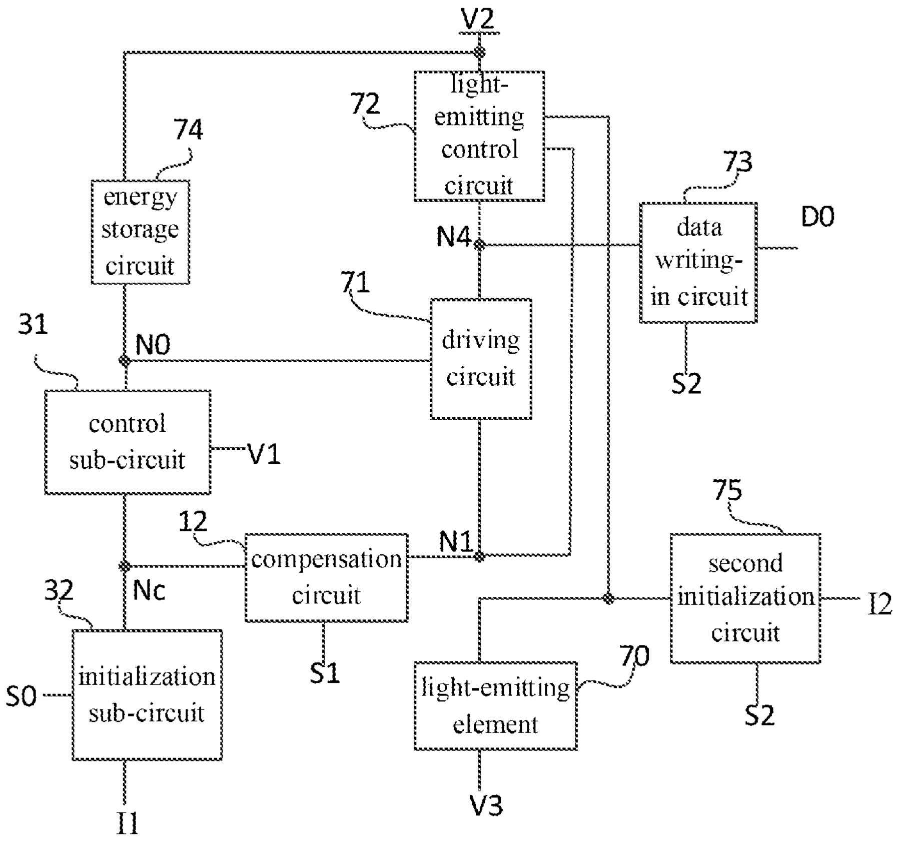
FIG. 13 is a structural diagram of a pixel circuit according to at least one embodiment of the present disclosure.

As shown in FIG. 13, on the basis of at least one embodiment of the pixel circuit shown in FIG. 2, the pixel circuit may further include a light-emitting element 70, a driving circuit 71, a light-emitting control circuit 72, a data writing-in circuit 73, an energy storage circuit 74 and a second initialization circuit 75, wherein, The data writing-in circuit 73 is respectively electrically connected to the data writing-in control terminal S2, the data line D0 and the fourth node N4, and is used to control to write the data voltage provided by the data line D0 into the fourth node N4 under the control of the data writing-in control signal provided by the data writing-in control terminal S2;

The light-emitting control circuit 72 is respectively electrically connected to the light-emitting control line E1, the second voltage terminal V2, the fourth node N4, the first node N1 and the light-emitting element 70, and is used to, under the control of the light-emitting control signal provided by the light-emitting control line E1, control the fourth node N4 to be connected to the second voltage terminal V2, and control the first node N1 to be connected to the first electrode of the light-emitting element 70;

The first terminal of the energy storage circuit 74 is electrically connected to the driving control node N0, the second terminal of the energy storage circuit 74 is electrically connected to the second voltage terminal V2, and the energy storage circuit 74 is used for storing electrical energy;

The driving circuit 71 is respectively electrically connected to the driving control node N0, the fourth node N4 and the first node N1, and is used to generate a driving current flowing from the fourth node N4 to the first node N1 under the control of the potential of the driving control node N0;

The second initialization circuit 75 is respectively electrically connected to the data writing-in control terminal S2, the second initial voltage terminal I2 and the first electrode of the light-emitting element 70, and is used to, under the control of the data writing-in control signal, control to write the second initial voltage provided by the second initial voltage terminal I2 into the first electrode of the light-emitting element 70;

The second electrode of the light-emitting element 70 is electrically connected to the third voltage terminal V3.

Figure 14:
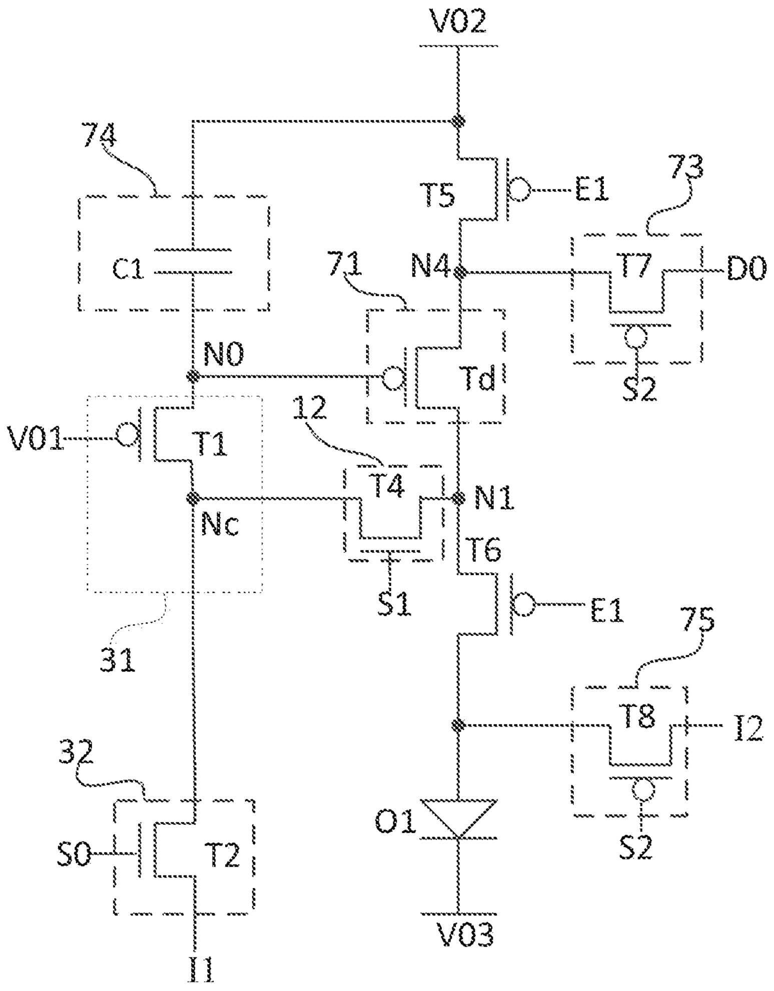
FIG. 14 is a circuit diagram of a pixel circuit according to at least one embodiment of the present disclosure.

As shown in FIG. 14, on the basis of at least one embodiment of the pixel circuit shown in FIG. 13, the light-emitting element is an organic light-emitting diode O1;

The driving circuit 71 includes a driving transistor Td, the light emitting control circuit 72 includes a fifth transistor T5 and a sixth transistor T6, the data writing-in circuit 73 includes a seventh transistor T7, and the energy storage circuit 74 includes a storage capacitor C1, the second initialization circuit 75 includes an eighth transistor T8;

The control sub-circuit 31 includes a first transistor T1, the initialization sub-circuit 32 includes a second transistor T2; the compensation circuit 12 includes a fourth transistor T4;

The gate electrode of the first transistor T1 is electrically connected to the first low voltage terminal, the source electrode of the first transistor T1 is electrically connected to the compensation node Nc, and the drain electrode of the first transistor T1 is electrically connected to the driving control node N0;

The gate electrode of the second transistor T2 is electrically connected to the first initial control terminal S0, the drain electrode of the second transistor T2 is electrically connected to the first initial voltage terminal I1, and the source electrode of the second transistor T2 is electrically connected to the compensation node Nc;

The gate electrode of the fourth transistor T4 is electrically connected to the compensation control terminal S1, the drain electrode of the fourth transistor T4 is electrically connected to the compensation node Nc, and the source electrode of the fourth transistor T4 is electrically connected to the first node N1;

The gate electrode of the driving transistor Td is electrically connected to the driving control node N0, the source electrode of the driving transistor Td is electrically connected to the fourth node N4, and the drain electrode of the driving transistor Td is electrically connected to the first node N1;

The gate electrode of the fifth transistor T5 is electrically connected to the light-emitting control line E1, the source electrode of the fifth transistor T5 is electrically connected to the high voltage terminal, and the drain electrode of the fifth transistor T5 is electrically connected to the fourth node N4; the high voltage terminal is used to provide a high voltage signal V02;

The gate electrode of the sixth transistor T6 is electrically connected to the light-emitting control line E1, the source electrode of the sixth transistor T6 is electrically connected to the first node N1, and the drain electrode of the sixth transistor T6 is electrically connected to the anode of O1;

The gate electrode of the seventh transistor T7 is electrically connected to the data writing-in control terminal S2, the source electrode of the seventh transistor T7 is electrically connected to the data line D0, and the drain electrode of the seventh transistor T7 is electrically connected to the fourth node N4;

The first terminal of the storage capacitor C1 is electrically connected to the driving control node N0, and the second terminal of the storage capacitor is electrically connected to the high voltage terminal;

The gate electrode of the eighth transistor T8 is electrically connected to the data writing-in control terminal S2, the source electrode of the eighth transistor T8 is electrically connected to the second initial voltage terminal I2, and the drain electrode of the eighth transistor T8 is electrically connected to the anode of O1;

The cathode of O1 is electrically connected to the second low voltage terminal, and the second low voltage terminal is used for providing the second low voltage signal V03. In at least one embodiment of the pixel circuit shown in FIG. 14, T1, Td, T5, T6, T7 and T8 are all low temperature polysilicon thin film transistors, and T2 and T4 are both oxide thin film transistors.

In at least one embodiment of the pixel circuit shown in FIG. 14, the first voltage terminal is a first low voltage terminal, the second voltage terminal is a high voltage terminal, and the third voltage terminal is a second low voltage terminal.

In at least one embodiment of the pixel circuit shown in FIG. 14, T1 is a normally-on transistor.

In at least one embodiment of the pixel circuit shown in FIG. 14, T2 can be protected by the design of T1 as a normally-on transistor; when the potential of N0 jumps, voltage division may be implemented by T1 to prevent the gate-source voltage of T2 from being too large. At the same time, T1 is equivalent to a stable MOS capacitor, which can effectively stabilize the potential of N0 and avoid the potential of N0 from being affected by the potential of N1, the potential of N4 and the signal line (for example, the signal line can be S0, S1 and S2), Flick may be improved especially at low frequencies.

In at least one embodiment shown in FIG. 14, the voltage value of the first initial voltage provided by I1 may be greater than the voltage value of the second initial voltage provided by I2, and there are two transistors in the first current leakage path from N0 to I1, there are four transistors in the second current leakage path from N0 to I2, the voltage value of the first initial voltage is set to be greater than the voltage value of the second initial voltage (for example, the voltage value of the first initial voltage may be about −2.2V, the voltage value of the second initial voltage can be about −2.5V), so that the voltage difference between the driving control node N0 and the first initial voltage terminal I1 is small, and the current leakage phenomenon is improved;

When the pixel circuit is in the high-brightness display mode, since the voltage value of the second low voltage signal is correspondingly reduced to achieve high brightness, the voltage value of the second initial voltage can also be correspondingly reduced (at this time, the voltage value of the second initial voltage may be related to the voltage value of the second low voltage signal), and the voltage value of the first initial voltage may be greater than the voltage value of the second initial voltage, so as to reduce or minimize the leakage current from N0 to I1;

When the pixel circuit is in the low-brightness display mode, since the voltage value of the second low-voltage signal is correspondingly increased to achieve low brightness, the voltage value of the second initial voltage can also be correspondingly increased (at this time, the voltage value of the second initial voltage may be related to the voltage value of the second low voltage signal), the voltage value of the second initial voltage may be greater than the voltage value of the first initial voltage, and the leakage current from the driving control node to the second initial voltage terminal decreases accordingly.

As shown in FIG. 9, when at least one embodiment of the pixel circuit shown in FIG. 14 is in operation, the display period may include an initialization phase t1, a data writing-in phase t2, and a light-emitting phase t3 that are set in sequence;

In the initialization phase t1, S0 provides a low voltage signal, T2 is turned on, and T1 is turned on to provide the first initial voltage provided by I1 to N0, so that Td can be turned on when the data writing-in phase starts;

In the initialization phase t1, S1 provides a low voltage signal, T4 is turned off, S2 and E1 provide a high voltage signal, and T5, T6, T7 and T8 are all turned off;

In the data writing-in phase t2, S0 provides a high voltage signal, T2 is turned off, S1 provides a high voltage signal, T4 is turned on, and T1 is turned on, so that N1 and N0 are connected; S2 provides a low voltage signal, and the data voltage Vd provided by D0 is written into N4 through T7;

At the beginning of the data writing-in phase t2, Td is turned on to charge C1 through the data voltage Vd, and the potential of N0 is increased until the potential of N0 becomes Vd+Vth, Td is turned off, and Vth is the threshold voltage of Td;

In the data writing-in phase t2, S2 provides a low voltage signal, and T8 is turned on to write the second initial voltage provided by I2 into the anode of O1 to clear the charge remaining at the anode of O1; E1 provides a high voltage signal, both T5 and T6 are turned off;

In the light-emitting phase t3, S0 provides a high voltage signal, S1 provides a low voltage signal, T2 is turned off, T4 is turned off, S2 provides a high voltage signal, E1 provides a low voltage signal, T7 and T8 are all turned off, and Td, T5 and T6 are all turned on, Td drives O1 to emit light.

The pixel driving method described in the embodiment of the present disclosure is applied to the above-mentioned pixel circuit, and the display period includes an initialization phase and a data writing-in phase that are set in sequence; the pixel driving method includes:

In the initialization phase, controlling, by the first initialization circuit, the first initial voltage terminal to provide the first initial voltage to the driving control node under the control of the first initial control signal provided by the first initial control terminal;

In the data writing-in phase, controlling, by the compensation circuit, the compensation node to be connected to the first node under the control of the compensation control signal provided by the compensation control terminal.

In the pixel circuit to which the pixel driving method according to the embodiment of the present disclosure is applied, at least one of the first initialization circuit and the compensation circuit includes an oxide thin film transistor and a low temperature polysilicon thin film transistor connected in series, so that the circuit for initializing the potential of the driving control node and/or the circuit for compensation includes not only oxide thin film transistors, but also low temperature polysilicon thin film transistors.

Optionally, the driving control node and the compensation node may be the same node.

Optionally, the driving control node and the compensation node are different nodes, and the first initialization circuit is further electrically connected to the first voltage terminal; the first initialization circuit includes a control sub-circuit and an initialization sub-circuit;

The step of controlling, by the first initialization circuit, the first initial voltage terminal to provide the first initial voltage to the driving control node under the control of the first initial control signal provided by the first initial control terminal may include: controlling, by the control sub-circuit, the driving control node to be connected to the compensation node under the control of the first voltage signal provided by the first voltage terminal; and controlling, by the initialization sub-circuit, to write the first initial voltage into the compensation node under the control of the first initial control signal;

The pixel driving method according to at least one embodiment of the present disclosure may further include: in the data writing-in phase, controlling, by the control sub-circuit, the driving control node to be connected to the compensation node under the control of the first voltage signal provided by the first voltage terminal, so that the first node is connected to the driving control node.

In at least one embodiment of the present disclosure, when the driving control node and the compensation node are the same node, the first initialization circuit is further electrically connected to a first voltage terminal; the first initialization circuit includes a control sub-circuit and an initialization sub-circuit, the step of controlling, by the first initialization circuit, the first initial voltage terminal to provide the first initial voltage to the driving control node under the control of the first initial control signal provided by the first initial control terminal includes:

Controlling, by the control sub-circuit, to write the first initial voltage into the second node under the control of the first voltage signal provided by the first voltage terminal; controlling, by the initialization sub-circuit, the second node to be connected to the driving control node under the control of the first initial control signal.

In a specific implementation, the first initialization circuit may include a control sub-circuit and an initialization sub-circuit, the control sub-circuit controls to write the first initial voltage into the second node, and the initialization sub-circuit controls the second node to be connected to the driving control node, so as to write the first initial voltage into the driving control node.

In at least one embodiment of the present disclosure, when the driving control node and the compensation node are the same node, the first initialization circuit is further electrically connected to a first voltage terminal; the first initialization circuit includes a control sub-circuit and an initialization sub-circuit, the step of controlling, by the first initialization circuit, the first initial voltage terminal to provide the first initial voltage to the driving control node under the control of the first initial control signal provided by the first initial control terminal includes:

Controlling, by the control sub-circuit, the driving control node to be connected to the second node under the control of the first voltage signal provided by the first voltage terminal; controlling, by the initialization sub-circuit, to write the first initial voltage into the second node under the control of the first initial control signal.

In a specific implementation, the first initialization circuit may include a control sub-circuit and an initialization sub-circuit, the control sub-circuit controls the driving control node to be connected to the second node, and the initialization sub-circuit controls to write the first initial voltage into the second node, to control to write the first initial voltage into the driving control node.

Optionally, the compensation circuit is also electrically connected to the first voltage terminal, and the compensation circuit includes a first compensation sub-circuit and a second compensation sub-circuit; the step of controlling, by the compensation circuit, the driving control node to be connected to the first node under the control of a compensation control signal provided by the compensation control terminal includes:

Controlling, by the first compensation sub-circuit, the driving control node to be connected to the third node under the control of the first voltage signal provided by the first voltage terminal; controlling, by the second compensation sub-circuit, the third node to be connected to the first node under the control of the compensation control signal.

In a specific implementation, the compensation circuit may include a first compensation sub-circuit and a second compensation sub-circuit, the first compensation sub-circuit controls the driving control node to be connected to the third node, and the second compensation sub-circuit controls the third node to be connected to the first node, so as to control the driving control node to be connected to the first node.

Optionally, the compensation circuit is also electrically connected to the first voltage terminal, and the compensation circuit includes a first compensation sub-circuit and a second compensation sub-circuit; the step of controlling, by the compensation circuit, the driving control node to be connected to the first node under the control of a compensation control signal provided by the compensation control terminal includes:

Controlling, by the first compensation sub-circuit, the third node to be connected to the first node under the control of the first voltage signal provided by the first voltage terminal; controlling, by the second compensation sub-circuit, the third node to be connected to the driving control node under the control of the compensation control signal.

In a specific implementation, the compensation circuit may include a first compensation sub-circuit and a second compensation sub-circuit, the first compensation sub-circuit controls the third node to be connected to the first node, and the second compensation sub-circuit controls the third node to be connected to the driving control node, so as to control the driving control node to be connected to the first node.

The display device according to the embodiment of the present disclosure includes the above-mentioned pixel circuit.

The display device provided by at least one embodiment of the present disclosure may be any product or component with a display function, such as a mobile phone, a tablet computer, a TV, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a first initialization circuit and a compensation circuit;

the first initialization circuit is electrically connected to a driving control node, a first initial control terminal and a first initial voltage terminal, and is configured to control the first initial voltage terminal to provide a first initial voltage to the driving control node under the control of a first initial control signal provided by the first initial control terminal;

the compensation circuit is electrically connected to a compensation control terminal, a compensation node and a first node, and is configured to control the compensation node to be connected to the first node under the control of a compensation control signal provided by the compensation control terminal;

at least one of the first initialization circuit and the compensation circuit includes an oxide thin film transistor and a low temperature polysilicon thin film transistor connected in series;

wherein the driving control node and the compensation node are different nodes;

the first initialization circuit is further electrically connected to a first voltage terminal; the first initialization circuit includes a control sub-circuit and an initialization sub-circuit;

the control sub-circuit is respectively electrically connected to the first voltage terminal, the driving control node and the compensation node, and is configured to control the driving control node to be connected to the compensation node under the control of the first voltage signal provided by the first voltage terminal; and the initialization sub-circuit is electrically connected to a first initial control terminal, a first initial voltage terminal and the compensation node, and is configured to write the first initial voltage into the compensation node under the control of the first initial control signal.

2. The pixel circuit according to claim 1, wherein the control sub-circuit includes a first transistor, and the initialization sub-circuit includes a second transistor;

a control electrode of the first transistor is electrically connected to the first voltage terminal, a first electrode of the first transistor is electrically connected to the compensation node, and a second electrode of the first transistor is electrically connected to the driving control node;

a control electrode of the second transistor is electrically connected to the first initial control terminal, a first electrode of the second transistor is electrically connected to the first initial voltage terminal, and a second electrode of the second transistor is electrically connected to the compensation node;

the first transistor is the low temperature polysilicon thin film transistor, and the second transistor is the oxide thin film transistor;

the first voltage terminal is a first low voltage terminal.

3. The pixel circuit according to claim 1, wherein the compensation circuit is further electrically connected to a first voltage terminal, and the compensation circuit includes a first compensation sub-circuit and a second compensation sub-circuit;

the first compensation sub-circuit is electrically connected to the first voltage terminal, the compensation node and a third node, and is configured to control the compensation node to be connected to the third node under the control of the first voltage signal provided by the first voltage terminal;

the second compensation sub-circuit is electrically connected to the compensation control terminal, the third node and the first node, and is configured to control the third node to be connected to the first node under the control of the compensation control signal.

4. The pixel circuit according to claim 3, wherein the first compensation sub-circuit includes a third transistor, and the second compensation sub-circuit includes a fourth transistor;

a control electrode of the third transistor is electrically connected to the first voltage terminal, a first electrode of the third transistor is electrically connected to the compensation node, and a second electrode of the third transistor is electrically connected to the third node;

a control electrode of the fourth transistor is electrically connected to the compensation control terminal, a first electrode of the fourth transistor is electrically connected to the third node, and a second electrode of the fourth transistor is electrically connected to the first node;

the third transistor is the oxide thin film transistor, and the fourth transistor is the low temperature polysilicon thin film transistor.

5. The pixel circuit according to claim 1, wherein the compensation circuit is further electrically connected to the first voltage terminal, and the compensation circuit includes a first compensation sub-circuit and a second compensation sub-circuit;

the first compensation sub-circuit is electrically connected to the first voltage terminal, the third node and the first node respectively, and is configured to control the third node to be connected to the first node under the control of the first voltage signal provided by the first voltage terminal;

the second compensation sub-circuit is electrically connected to the compensation control terminal, the third node and the compensation node, and is configured to control the third node to be connected to the compensation node under the control of the compensation control signal.

6. The pixel circuit according to claim 5, wherein the first compensation sub-circuit includes a third transistor, and the second compensation sub-circuit includes a fourth transistor;

a control electrode of the third transistor is electrically connected to the first voltage terminal, a first electrode of the third transistor is electrically connected to the third node, and a second electrode of the third transistor is electrically connected to the first node;

a control electrode of the fourth transistor is electrically connected to the compensation control terminal, a first electrode of the fourth transistor is electrically connected to the compensation node, and a second electrode of the fourth transistor is electrically connected to the third node;

the third transistor is the oxide thin film transistor, and the fourth transistor is the low temperature polysilicon thin film transistor.

7. The pixel circuit according to claim 1, further comprising a light-emitting element, a driving circuit, a light-emitting control circuit, a data writing-in circuit, and an energy storage circuit, wherein, the data writing-in circuit is electrically connected to a data writing-in control terminal, a data line and a fourth node respectively, and is configured to control to write a data voltage provided by the data line into the fourth node under the control of a data writing-in control signal provided by the data writing-in control terminal;

the light-emitting control circuit is respectively electrically connected to a light-emitting control line, a second voltage terminal, the fourth node, the first node and the light-emitting element, and is configured to control the fourth node to be connected to the second voltage terminal and control the first node to be connected to the light-emitting element under the control of a light-emitting control signal provided by the light-emitting control line;

a first terminal of the energy storage circuit is electrically connected to the driving control node, a second terminal of the energy storage circuit is electrically connected to the second voltage terminal, and the energy storage circuit is used for storing electrical energy;

the driving circuit is electrically connected to the driving control node, the fourth node and the first node, and is configured to generate a driving current flowing from the fourth node to the first node under the control of a potential of the driving control node.

8. The pixel circuit according to claim 7, further comprising a second initialization circuit;

the second initialization circuit is electrically connected to the data writing-in control terminal, a second initial voltage terminal and a first electrode of the light-emitting element, and is configured to control to write a second initial voltage provided by the second initial voltage terminal into the first electrode of the light-emitting element under the control of the data writing-in control signal;

a second electrode of the light-emitting element is electrically connected to a third voltage terminal.

9. The pixel circuit according to claim 8, wherein the second initialization circuit includes an eighth transistor;

a control electrode of the eighth transistor is electrically connected to the data writing-in control terminal, a first electrode of the eighth transistor is electrically connected to the second initial voltage terminal, and a second electrode of the eighth transistor is electrically connected to the first electrode of the light-emitting element;

the eighth transistor is the low temperature polysilicon thin film transistor.

10. The pixel circuit according to claim 7, wherein the driving circuit includes a driving transistor, the light-emitting control circuit includes a fifth transistor and a sixth transistor, the data writing-in circuit includes a seventh transistor, and the energy storage circuit includes a storage capacitor, wherein, a control electrode of the driving transistor is electrically connected to the driving control node, a first electrode of the driving transistor is electrically connected to the fourth node, and a second electrode of the driving transistor is electrically connected to the first node;

a control electrode of the fifth transistor is electrically connected to the light-emitting control line, a first electrode of the fifth transistor is electrically connected to the second voltage terminal, and a second electrode of the fifth transistor is electrically connected to the fourth node;

a control electrode of the sixth transistor is electrically connected to the light-emitting control line, a first electrode of the sixth transistor is electrically connected to the first node, and a second electrode of the sixth transistor is electrically connected to the light-emitting element;

a control electrode of the seventh transistor is electrically connected to the data writing-in control terminal, a first electrode of the seventh transistor is electrically connected to the data line, and a second electrode of the seventh transistor is electrically connected to the fourth node;

a first terminal of the storage capacitor is electrically connected to the driving control node, and a second terminal of the storage capacitor is electrically connected to the second voltage terminal.

11. A pixel driving method, applied to the pixel circuit according to claim 1, wherein a display period includes an initialization phase and a data writing-in phase that are set in sequence; the pixel driving method comprises:

in the initialization phase, controlling, by the first initialization circuit, the first initial voltage terminal to provide the first initial voltage to the driving control node under the control of the first initial control signal provided by the first initial control terminal;

in the data writing-in phase, controlling, by the compensation circuit, the compensation node to be connected to the first node under the control of the compensation control signal provided by the compensation control terminal.

12. The pixel driving method according to claim 11, wherein the driving control node and the compensation node are different nodes, and the first initialization circuit is further electrically connected to the first voltage terminal; the first initialization circuit includes a control sub-circuit and an initialization sub-circuit;

the step of controlling, by the first initialization circuit, the first initial voltage terminal to provide the first initial voltage to the driving control node under the control of the first initial control signal provided by the first initial control terminal includes:

controlling, by the control sub-circuit, the driving control node to be connected to the compensation node under the control of the first voltage signal provided by the first voltage terminal; and controlling, by the initialization sub-circuit, to write the first initial voltage into the compensation node under the control of the first initial control signal.

13. The pixel driving method according to claim 11, wherein the compensation circuit is also electrically connected to the first voltage terminal, and the compensation circuit includes a first compensation sub-circuit and a second compensation sub-circuit; the step of controlling, by the compensation circuit, the compensation node to be connected to the first node under the control of a compensation control signal provided by the compensation control terminal includes:

controlling, by the first compensation sub-circuit, the compensation node to be connected to the third node under the control of the first voltage signal provided by the first voltage terminal; controlling, by the second compensation sub-circuit, the third node to be connected to the first node under the control of the compensation control signal; or wherein the compensation circuit is further electrically connected to the first voltage terminal, and the compensation circuit includes a first compensation sub-circuit and a second compensation sub-circuit; the step of controlling, by the compensation circuit, the compensation node to be connected to the first node under the control of a compensation control signal provided by the compensation control terminal includes:

controlling, by the first compensation sub-circuit, the third node to be connected to the first node under the control of the first voltage signal provided by the first voltage terminal; controlling, by the second compensation sub-circuit, the third node to be connected to the compensation node under the control of the compensation control signal.

* * * * *